United States Patent
Crice et al.

(10) Patent No.: US 9,594,175 B2
(45) Date of Patent: Mar. 14, 2017

(54) MULTIMODE SEISMIC SURVEY SYSTEM

(71) Applicant: Wireless Seismic, Inc., Louisville, CO (US)

(72) Inventors: Douglas B. Crice, Grass Valley, CA (US); Roy Kligfield, Boulder, CO (US); Keith Elder, Richmond, TX (US)

(73) Assignee: Wireless Seismic, Inc., Sugar Land, TX (US)

( * ) Notice: Subject to any disclaimer, the term of this patent is extended or adjusted under 35 U.S.C. 154(b) by 373 days.

(21) Appl. No.: 14/205,902

(22) Filed: Mar. 12, 2014

(65) Prior Publication Data

US 2014/0307526 A1 Oct. 16, 2014

Related U.S. Application Data

(60) Provisional application No. 61/787,765, filed on Mar. 15, 2013.

(51) Int. Cl.
  *G01V 1/22* (2006.01)
  *G01V 1/00* (2006.01)
(52) U.S. Cl.
  CPC ............... *G01V 1/22* (2013.01); *G01V 1/003* (2013.01)
(58) Field of Classification Search
  CPC ........... G01V 1/003; G01V 1/22; G01V 1/223
  USPC ...................................... 367/56, 77
  See application file for complete search history.

(56) References Cited

U.S. PATENT DOCUMENTS

| | | | | |
|---|---|---|---|---|
| 4,583,206 A | * | 4/1986 | Rialan ............... | G01V 1/22 340/539.1 |
| 4,979,152 A | * | 12/1990 | Rialan ............... | G01V 1/22 340/539.1 |
| 6,061,299 A | * | 5/2000 | Grouffal ............ | G01V 1/22 367/49 |
| 7,773,457 B2 | | 8/2010 | Crice et al. | |
| 7,869,444 B2 | * | 1/2011 | Menard ............. | G01D 21/00 370/400 |
| 8,614,928 B2 | | 12/2013 | Kooper et al. | |
| 2002/0161525 A1 | * | 10/2002 | Wisecup ............ | G01V 1/28 702/14 |
| 2013/0176817 A1 | | 7/2013 | Crice | |
| 2013/0265853 A1 | | 10/2013 | Wager et al. | |

* cited by examiner

*Primary Examiner* — Ian J Lobo
(74) *Attorney, Agent, or Firm* — Marsh Fischmann & Breyfogle LLP

(57) ABSTRACT

A multimode seismic survey system is disclosed where seismic information for a given seismic survey is read out by different seismic units using different modes. Such multimode systems encompass hybrid arrays where information is read out via different output modes for a single seismic event, and other multimode arrays where seismic information is read out via different modes for different seismic events. The modes utilized in such arrays may include wireless, nodal and/or cable modes. The multimode arrays can be implemented using multimode seismic units or single mode seismic units. In any event, the multimode arrays can be utilized to achieve a combination of advantages associated with the different readout modes or to address any of various multimode mode contexts in relation to seismic surveys.

29 Claims, 25 Drawing Sheets

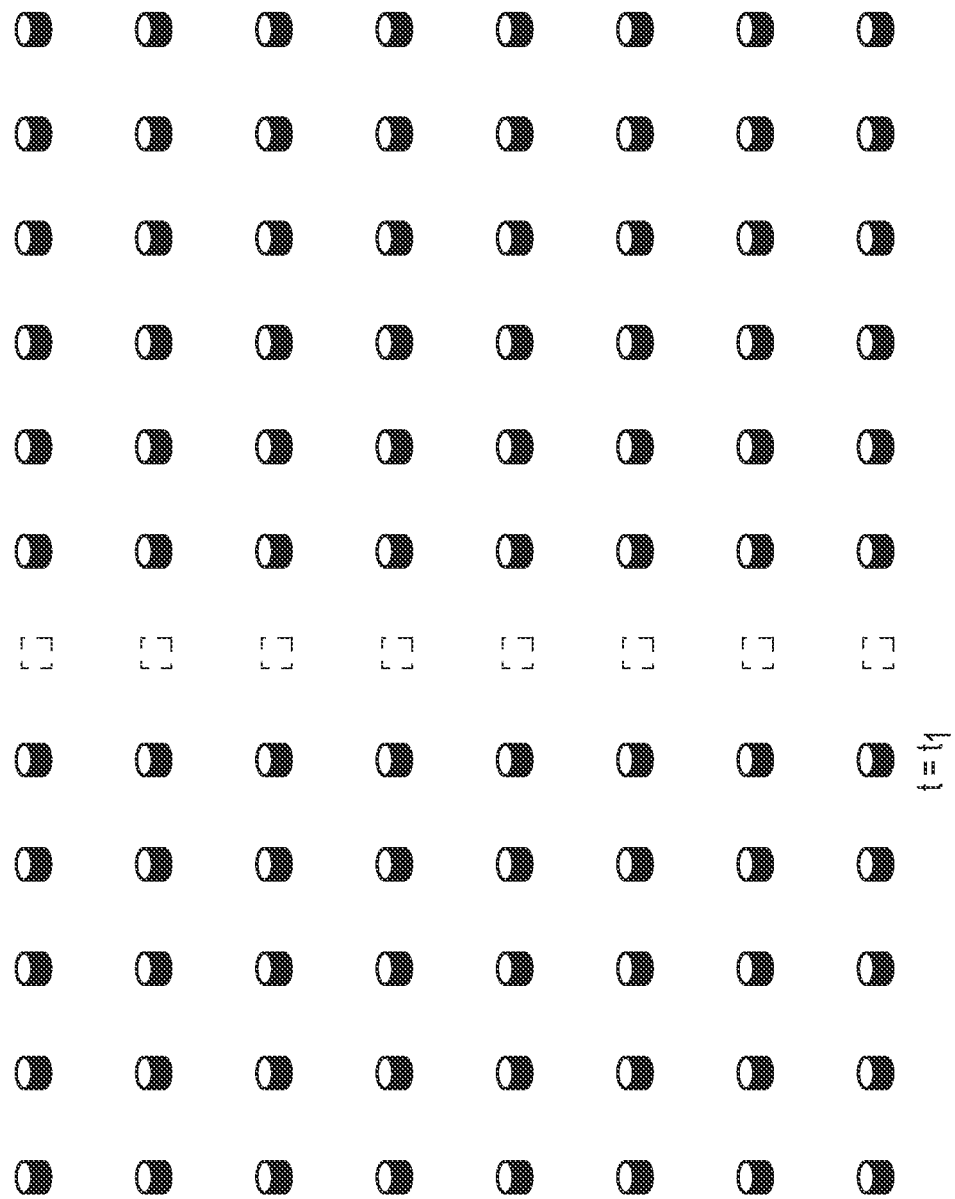

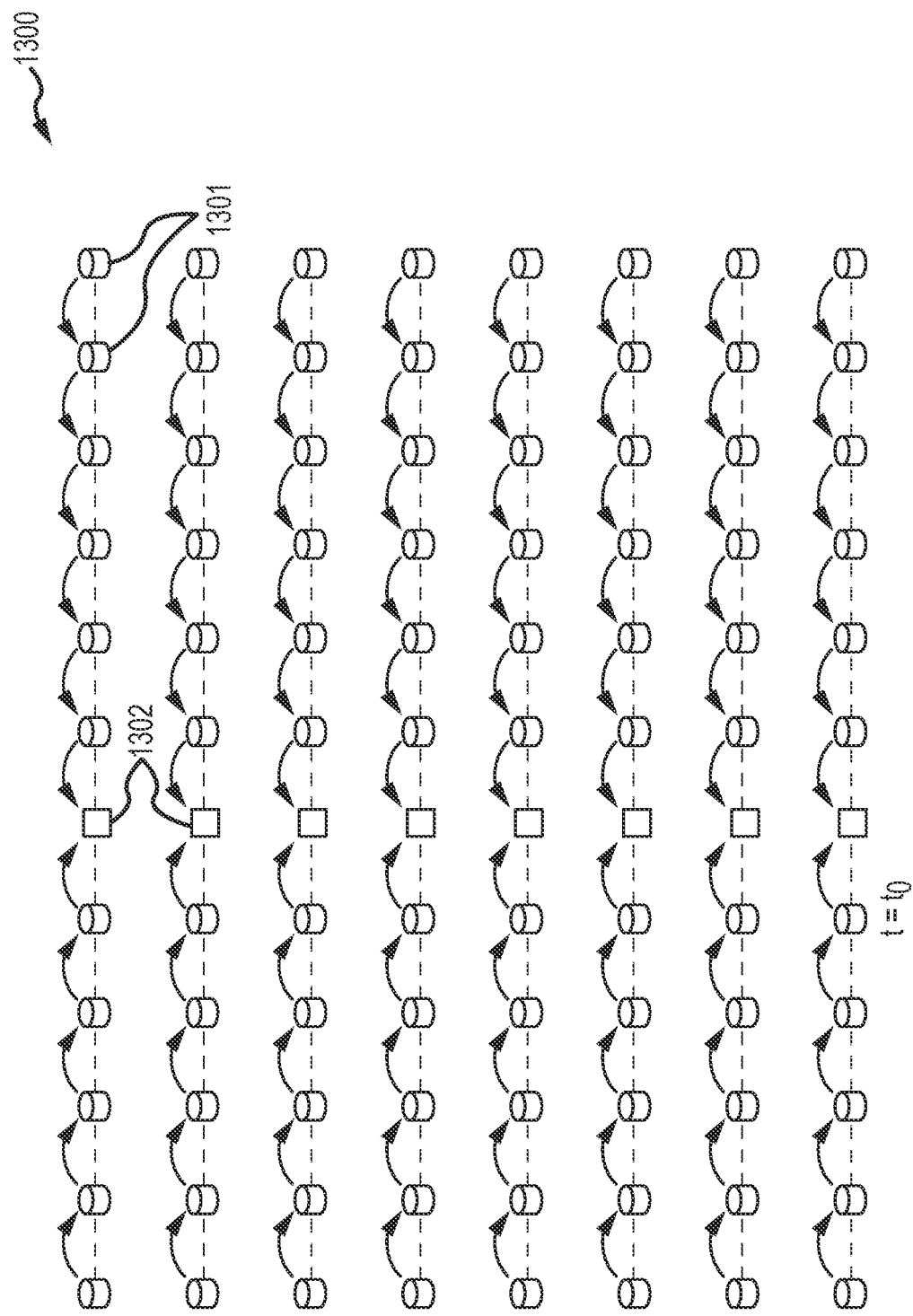

MULTIMODE SEISMIC SURVEY SYSTEM

CROSS-REFERENCE TO RELATED APPLICATION

This application claims priority from U.S. Provisional Application No. 61/787,765 filed on Mar. 15, 2013 entitled "MULTIMODE SEISMIC SURVEY SYSTEM," the contents of which are incorporated by reference herein as if set forth in full.

FIELD OF THE INVENTION

The present invention relates to equipment and methodology for conducting seismic surveys and, in particular, to seismic surveys involving a combination of two or more readout modes.

BACKGROUND OF THE INVENTION

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of natural resource exploration such as, for example, locating subterranean water and planning road construction.

A seismic survey is normally conducted by placing an array of vibration sensors (accelerometers or velocity sensors sometimes called "geophones") on the ground, typically in a line or in a grid of rectangular or other geometry. Vibrations are created by an energy source such as, for example, explosives or a mechanical device such as a vibrating energy source or a weight drop. The creation of vibrations by the vibration source may be referred to as a source event. Multiple source events may be used for some surveys. The vibrations from the source events propagate through the earth, taking various paths, refracting and reflecting from geological features such as discontinuities in the subsurface, and are detected by the array of vibration sensors. Signals from the sensors are amplified and digitized, either by separate electronics or internally in the case of "digital" sensors. In some cases, such as in populated areas, passive systems may be employed. In passive systems, rather than using a source to generate seismic events, the array may opportunistically utilize seismic events occurring naturally or generated by events outside the control of the survey operator.

The digital data from the sensors of the array is eventually recorded on storage media, for example magnetic tape, or magnetic or optical disks, or other memory device, along with related information pertaining to the survey. The survey may include multiple source events and/or the active sensors that may move such that the process is continued until multiple seismic records is obtained for a number of source events to comprise a seismic survey. Data from the survey are processed on computers to create the desired information about subsurface geologic structure. In this regard, the seismic information from the sensors of the array is generally synchronized and combined to generate image information that can be interpreted to yield the desired survey result. In general, as more sensors are used, placed closer together, and/or cover a wider area, the quality of the resulting image will improve. It has become common to use thousands of sensors in a seismic survey stretching over an area measured in square kilometers.

Several modes have been developed for reading out the data from the seismic units (e.g., conventional geophones or other units of a seismic survey). Conventionally, individual seismic units are connected by cables to form a line. Multiple lines are then generally distributed across the survey area, often interconnected by a backhaul line or "backbone." When such systems are practical and functioning properly, they provide substantial bandwidth for quickly reading out large volumes of data. However, in many cases, hundreds of kilometers of cables have been laid on the ground and used to connect the seismic units of such arrays. Large numbers of workers, motor vehicles, and helicopters are often used to deploy and retrieve these cables and the associated seismic sensors. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables connecting sensors create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

To avoid some of these difficulties, cableless readout modes have been developed. These include nodal and wireless readout systems. In nodal systems, seismic units are deployed in arrays, typically in similar configurations to conventional cabled arrays. However, instead of reading out seismic data via cables lines, the data is generally stored at each unit until the conclusion of the survey. The data can then be read out on a unit-by-unit basis, for example, by retrieving the units or removable memory, or by porting each unit to a portable data collection unit either via a physical connector or via near field communications.

In wireless readout systems, data is generally read out from individual seismic units while the survey is ongoing, via wireless communications. That is, a unit can be read out from its position in the array to a central collection point without requiring a worker to visit the unit. This may occur in substantially real-time (e.g., as data is being acquired) or on another basis. While there is some latency associated with reading out data from these systems in real-time operation, e.g., associated with serial data transfer, these systems are often referred to as real-time systems to distinguish them from blind systems that generally do not involve reading out data with the survey is ongoing. Such wireless communications may be transmitted serially from unit-to-unit en route to a central collection point, or individual units may communicate directly with a base station. These various types of systems have generally operated in separate but occasionally competing spheres.

SUMMARY OF THE INVENTION

The present invention is directed to a multimode seismic survey system and associated methodology where seismic information for a given seismic survey is read out by seismic units of the array using different modes. The present inventors have recognized that there are a number of contexts where it may be desirable to utilize multiple readout modes, e.g., substantially simultaneously, in a single survey. These contexts include hybrid arrays, where seismic data related to a given seismic event is read out by different seismic units using different output modes, and other multimode contexts.

One such multimode context relates to varying conditions across a seismic array. For example, it may be desired to implement a given survey principally in conventional cable mode. However, there may be portions of the survey area that would benefit from cableless (real-time and/or nodal) operation, e.g., because those areas are populated or are traversed by roads, waterways, fences or other obstructions. Conversely, it may be desired to execute a survey principally in wireless readout mode, but to selectively use cable connections, for example, in areas where the terrain could interfere with wireless communication. Such surveys can be optimized, in accordance with the present invention, by populating the array with a combination of seismic units using different readout modes.

Another context where a hybrid survey may be useful relates to implementing an array with distributed collection points. For example, certain seismic units in an array may be designated to serve as data collection points and to operate in nodal readout mode. Each of these collection points may be associated with a line or other geometry of seismic units that communicate—wirelessly and/or via cables, and serially and/or parallel—seismic data to the collection point. This may be desired, for example, to simplify data collection in relation to a fully nodal implementation.

Yet another context where a multimode seismic survey system may be useful relates to survey monitoring. As noted above, one disadvantage of nodal systems is that surveys are generally conducted blind. It may be desired to implement a survey principally in nodal mode, but to provide a subset of cabled and/or wireless units to allow some degree of real-time monitoring during the survey. As a further alternative, different modes may be used for different kinds of data, e.g., a remote reporting mode (e.g., cable or wireless) may be used for test or quality control data whereas a nodal mode may be used to collect seismic survey data. It will be appreciated that many other hybrid survey contexts are envisioned.

In the contexts noted above, multiple output modes may be used in relation to processing seismic data from a single seismic event. In many other contexts, a given seismic unit or different units may use different output modes at different time during a survey. For example, arrays or units that are generally operating in nodal node may be operated in remote reporting readout mode (e.g., wireless and/or cable), during an initial phase or periodically, to allow for monitoring. In other cases, arrays or units generally operating in nodal mode may read out data, e.g., via wireless transmissions at the conclusion of a survey or periodically, for example, to reduce labor, reduce memory capacity requirements, or to allow monitoring of the array. Arrays or units operating principally in remote reporting mode (wireless or cable) may operate in nodal mode at times due to cable damage, radio interference, bandwidth limitations, or any circumstance preventing real-time read out mode from keeping up with the survey, or other restrictions on transmissions. Many other multimode contexts are possible.

All of these survey contexts can be addressed, in accordance with one aspect of the present invention, by providing a survey system that includes multiple seismic units in an array for receiving signals corresponding to a given seismic survey, where at least a first seismic unit of the array operates in a first output mode and at least a second seismic unit or the array operates in a second mode. For example, the first seismic unit may operate in any one or more of conventional cabled, wireless and nodal modes, and the second seismic unit may operate in a different one or more of the same modes. Each of the first and second seismic units may be a single mode unit adapted for operation only in a specific output mode, or one or both of the units may be multimode units selectively capable of operation in one or more of multiple modes. The survey system may also include subsystems for provisioning time references across the array, including the first and second seismic units, and for synchronizing and combining seismic information from the first and second seismic units. In certain implementations, the array may utilize three or more different modes. Corresponding functionality is also provided in accordance with the invention.

In accordance with a further aspect of the present invention, a method is provided for operating a hybrid seismic array. The method involves configuring a seismic array for conducting a seismic survey where the array includes at least a first seismic unit and a second seismic unit; first operating the first and second seismic units to acquire first and second seismic information, respectively, corresponding to a given seismic event; second operating said first seismic unit to output said first seismic information via a first output mode; and third operating said second seismic unit to output said second seismic information via a second mode, wherein said first and second modes differ with respect to transmission modes by which information is transferred from said first and second seismic units, respectively, to an external processor. The first mode may be any one of conventional cabled, wireless and nodal modes and the second mode may be a different one of the same modes. It will be appreciated that three or more modes may be utilized. The methodology may further include receiving time reference at each of the first and second seismic units and time stamping the first and second seismic information based on the time reference information. Moreover, the methodology may further involve processing the first and second seismic information including synchronizing and combining the first and second seismic information. The invention also encompasses remotely controlling operating modes of seismic units. For example, an individual unit or sets of units (e.g., lines or other segments of an array) may be set to operate in a particular mode, switched from one mode to another, or deactivated (e.g., due to a malfunction, transmission restriction, or simply because the unit(s) are not needed) from a central location.

BRIEF DESCRIPTION OF THE DRAWINGS

For a more complete understanding of the present invention and further advantages thereof, reference is now made to the following detailed description taken in conjunction with the drawings in which:

FIGS. 12A-12C illustrate an array where seismic units switch from nodal to wireless readout mode during a survey in accordance with the present invention;

FIGS. 13A and 13B illustrate an array where seismic units switch from wireless readout to cable readout mode in accordance with the present invention;

DETAILED DESCRIPTION

In the following description, the invention is set forth is the context of various seismic units and seismic array systems relating to use of different readout modes for reading out seismic data, e.g., using different modes sequentially in a survey, using different modes in different surveys, operating individual seismic units in different modes simultaneously, and operating individual seismic units in different modes at different times. While a variety of examples are included, it will be appreciated that many other contexts and use cases are possible. Accordingly, the following description should be understood as illustrating various aspects of the invention and not by way of limitation.

The description is divided into a number of sections. The first section introduces some of the principal output modes and examples of arrays that can be used in practicing the invention. Thereafter, various multimode contexts are described. The subsequent sections describe, in turn, various multimode arrays and multimode units. While it will be appreciated that these multimode units are convenient for implementing multimode arrays, the concepts are distinct and multimode arrays can be implemented using single mode units (of different types) and multimode units can be used to implement single mode arrays. In the final sections, certain controls and processes related to these multimode contexts are described.

I. Arrays and Output Modes

Figure 1:
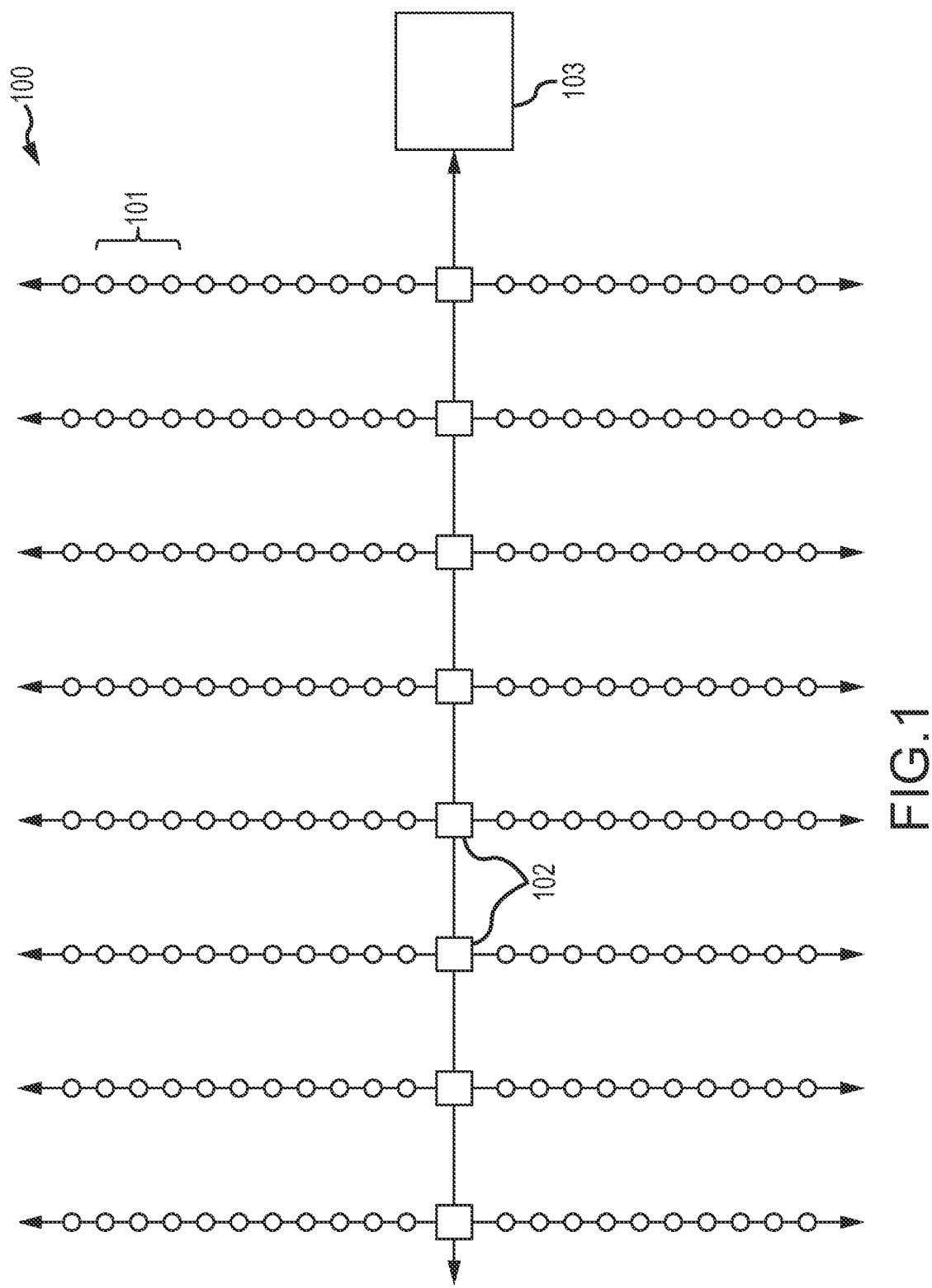
FIG. 1 illustrates a cabled seismic array that can be implemented in accordance with the present invention.

FIGS. 1-5 illustrate some of the principal output modes and examples of arrays that can be used in practicing the invention. Referring first to FIG. 1, a cabled seismic array 100 is illustrated. In the illustrated array 100, a number of seismic units 101 are connected by cables in a line and arrayed on the ground. Each of the units 101 includes one or more sensors configured as individual sensors, multi-component sensors, or strings of sensors wired into groups. As will be described below, each of the units 101 may contain electronics to amplify, digitize, and store the signals from the sensors, or in the case of digital sensors, collect and store the data. The units 101 may contain additional circuitry to test the sensors and/or acquisition circuitry to ensure proper function and performance. In the case of a multimode unit as described below, each of the units 101 may be configured to operate in cable output mode.

The units are connected together in a line by electrical or fiber optic cables and the line is connected to a second device 102 called a "line-tap" or "cross-line unit." These line-taps 102 are then connection together in a string, and eventually to a central control and recording system 103.

Seismic information is generally is acquired and passed down the cables from the units 101 to the line-taps 102, and then to the central control and recording system 103. Instructions and timing signals are passed up the cables from the central control and recording system 103 to the line-taps 102 and then to the seismic units 101. Other geometries may be used, including a linear array. Redundant lines or a ring topology may be used to provide alternate data and control paths in the event of failures or obstructions. The number of sensors deployed may vary considerably depending on the requirements of the survey.

The central control and recording system 103 usually consists of a computer with a display, keyboard, interface to the line-tap string, and digital storage system. In one implementation, the central control and recording system 103 might consist of a standard notebook computer with an Ethernet, USB, or wireless interface to connect to a line-tap string or to an interface device that connects to the line-tap string. Data may be stored on the computer's internal hard disk. For larger systems, the central control and recording system might consist of a larger computer with separate display and keyboard and separate storage device such as a tape drive, one or more hard disks, or some other storage device consistent with storing relatively large amounts of data.

Figure 2:
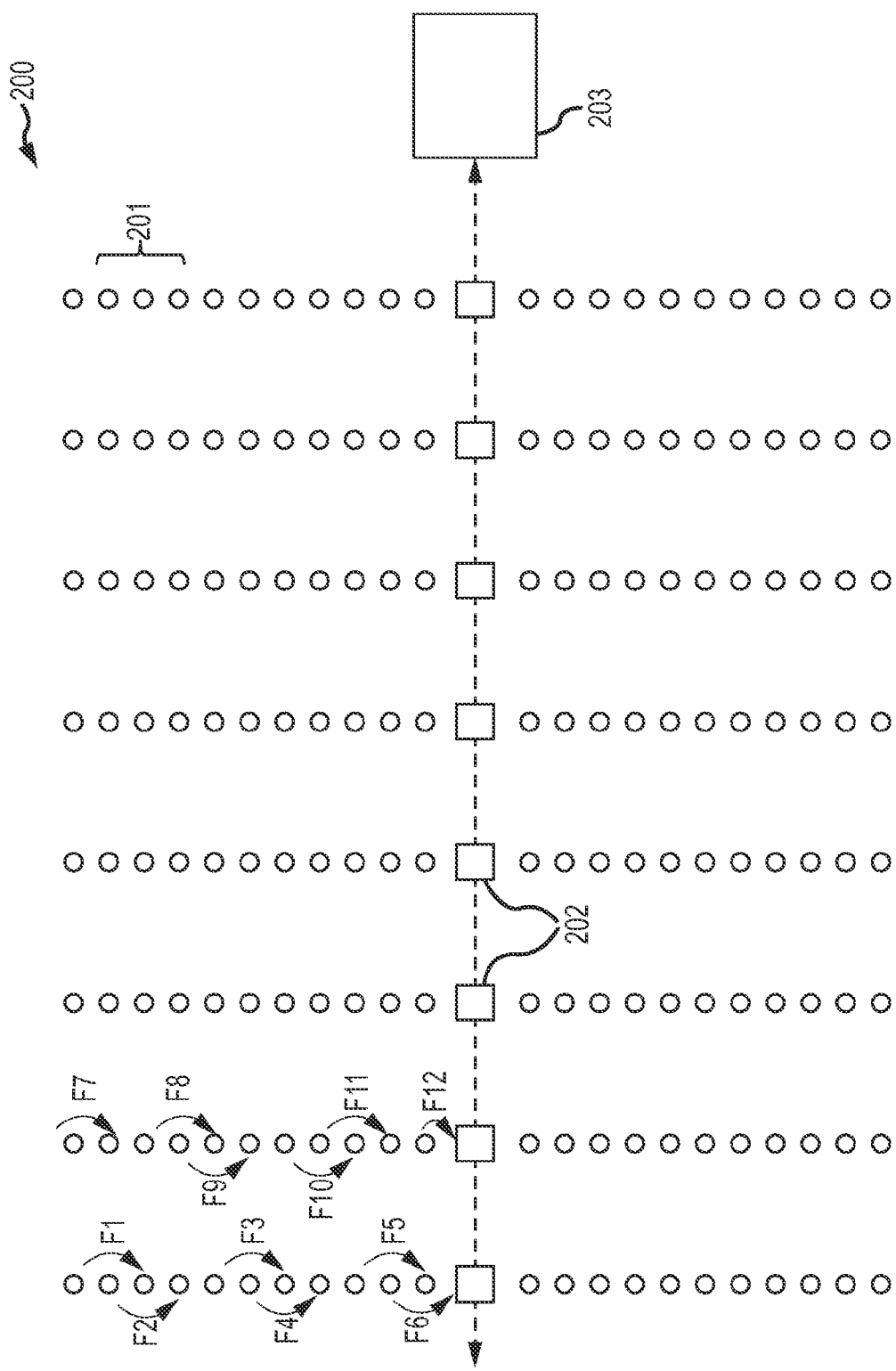
FIG. 2 illustrates a wireless seismic array employing serial data transfer readout paths as may be employed in accordance with the present invention.

In accordance the present invention, wireless seismic units can be used instead of cabled units. The positions of the wireless units might be the same as in a wired system, or the array might be adapted to exploit the flexibility of a wireless system. FIG. 2 shows one possible configuration of a wireless seismic array 200 in accordance with the present invention. In the illustrated array 200, a number of wireless seismic units 201 are arranged in lines as with the cabled array as shown in FIG. 1, except that there is no physical connection between the wireless seismic units 201. Replacing the line-tap modules are base station modules 202 which may be connected to a central control and recording system 203 by Ethernet, fiber optic, or other digital data link or a wireless substitute.

Example radio links operating on frequencies F1 to F12 are indicated by arrows. Note that for improved data rate, each radio link in the illustrated embodiment leaps past the nearest remote module to the next module closer to the base station. Other radio transmission paths are possible, including direct to the nearest remote module, leaping multiple modules, or in the case of an obstruction or equipment fault, past a defective remote module or even across to another line or any other logical path that establishes a communication flow. The central control and recording system may be a notebook computer or larger equivalent system. Such a wireless seismic system is described in detail in U.S. Pat. No. 7,773,457, which is incorporated herein by reference.

Figure 3:
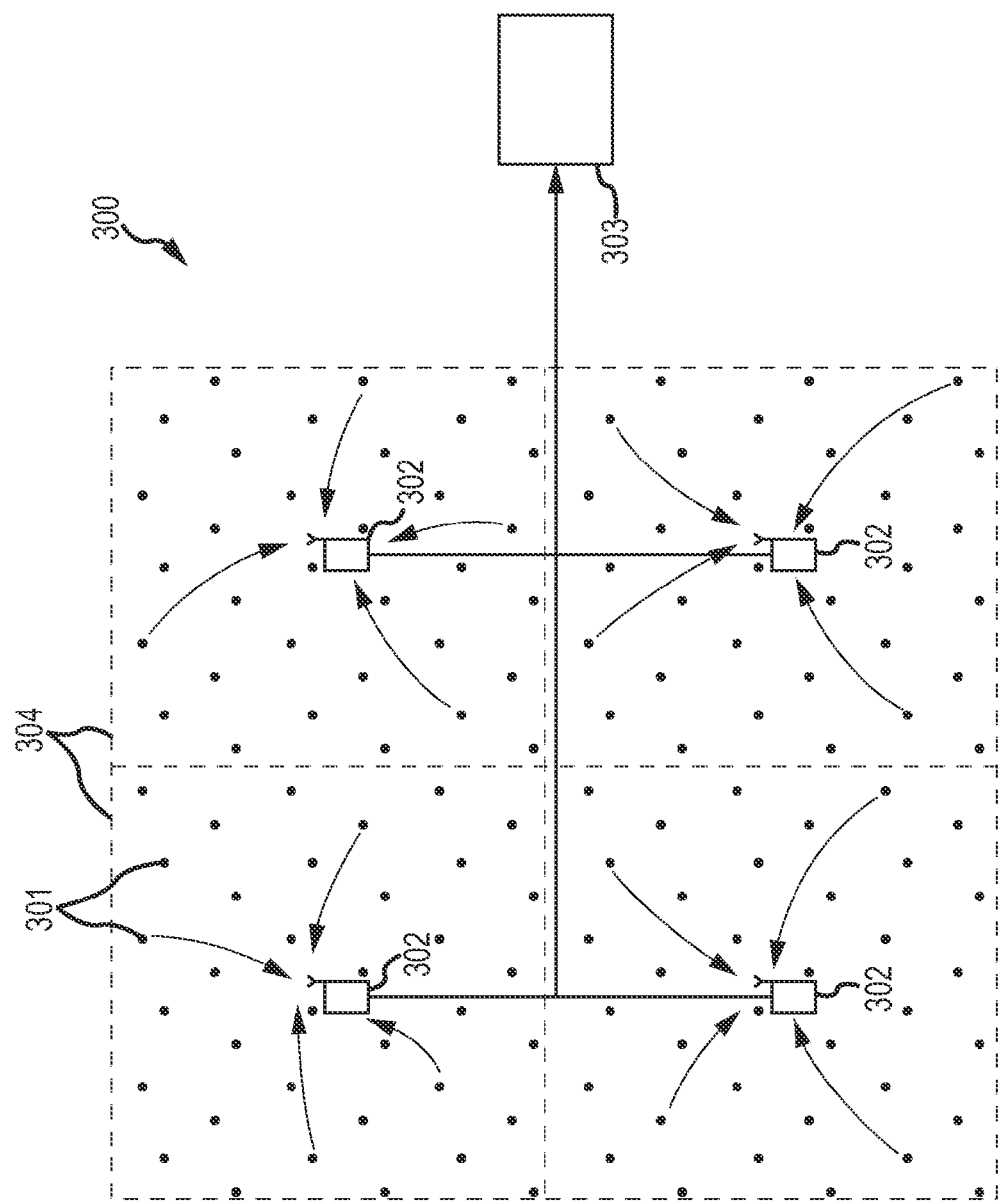
FIG. 3 illustrates a wireless seismic array employing parallel data readout paths as may be implemented in accordance with the present invention.

FIG. 3 illustrates a further configuration of wireless seismic array 300 that may be employed in practicing the present invention. The illustrated array 300 uses parallel, rather than serial, data paths for transferring seismic data from individual seismic units 301 to associated base stations 302. That is, in the illustrated array 300, each of the units 301 wirelessly transmits seismic data directly to a base station 302 rather than transferring seismic data to a neighboring unit which then transfers the data to a subsequent unit in bucket-brigade fashion. The seismic data may then be transferred from the base stations 302 to a central control and recording system 303 by Ethernet, optical fiber or other digital data link or a wireless communication. In the illustrated array 300, each of the units 301 transfers seismic data to the closest base station 302 resulting in partition of the array 300 into a number of regularly shaped sections 304. It will be appreciated, however, that the units 301 need not be constrained to communicating with the closest base station but may instead communicate with a different base station, for example, where such a configuration may improve signal strength due to the local terrain.

Figure 4:
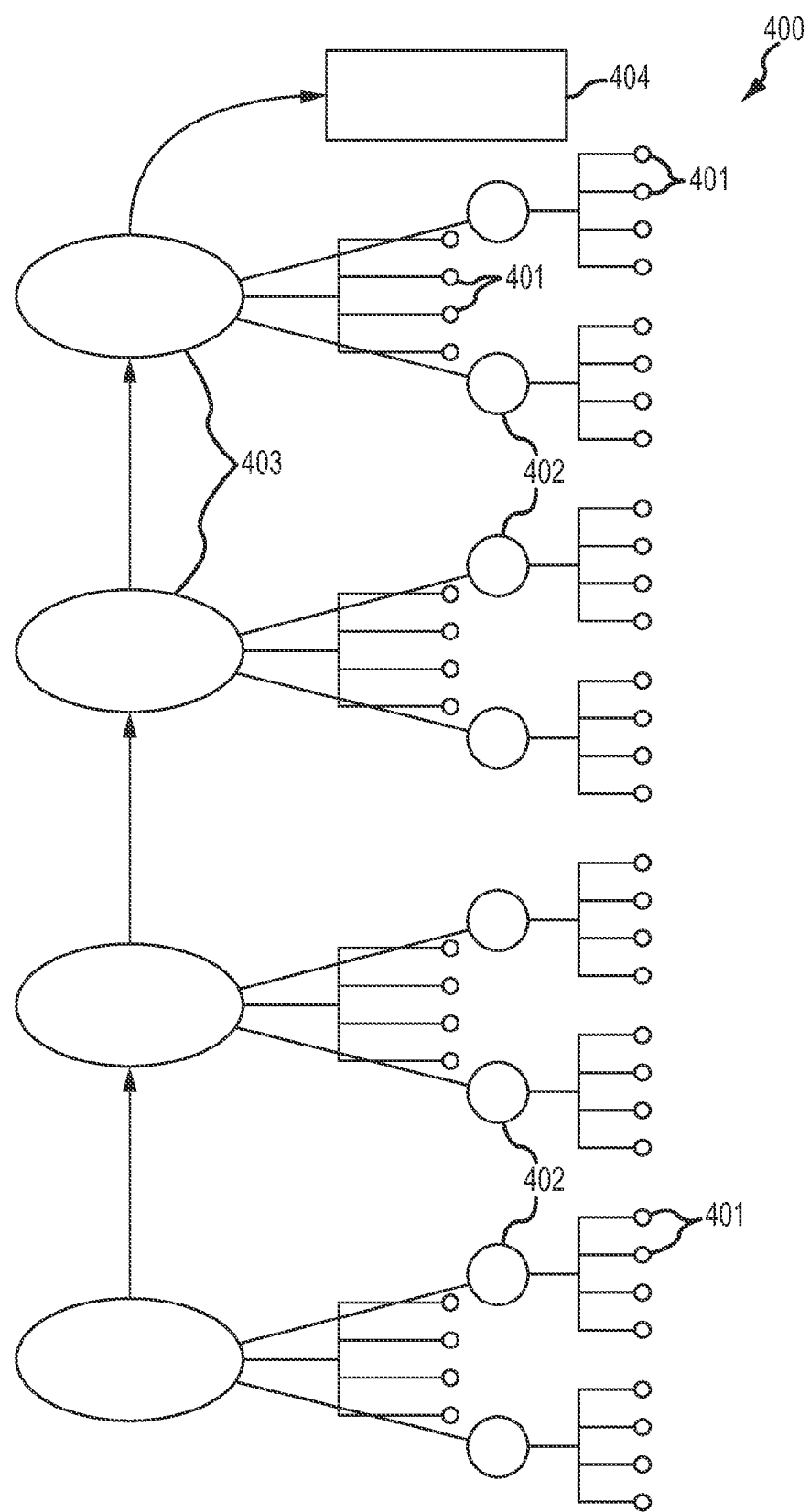
FIG. 4 illustrates a remote reporting seismic array (wireless or cabled) employing a combination of parallel and serial data transfer paths as can be implemented in accordance with the present invention.

FIG. 4 illustrates a still further configuration of a seismic array 400 that includes both parallel and serial data transfer paths. It will be appreciated that the seismic array 400 may be implemented with cabled or wireless data transfer paths or a combination thereof. In the illustrated array 400 a number of seismic units 401 communicate via parallel data paths with an associated base station 402. A number of base stations 402 can then communicate via parallel pathways with collection stations 403. The collection stations 403 then transfer data to a central control and recording system 404. It will be appreciated that, although the base stations 402 and data collection stations 403 are illustrated as being distinct from the seismic units 401, the same equipment can be configured to operate as any one of the seismic units 401, base stations 402, and data collection stations 403. That is, the base stations 402 and data collection stations 403 may include sensors for acquiring seismic data and may be identical to the seismic units 401 in other respects, but are simply configured to function as base stations 402 and data collection stations 403, respectively. It will thus be observed that parallel data transfer paths are established between units 401 of a given group and an associated base station 402 and also between base stations 402 and an associated data collection station 403. A serial data transfer path is defined between a unit 401, an associated base station 402, an associated data collection station 403, and the central control and recording system 404.

Figure 5:
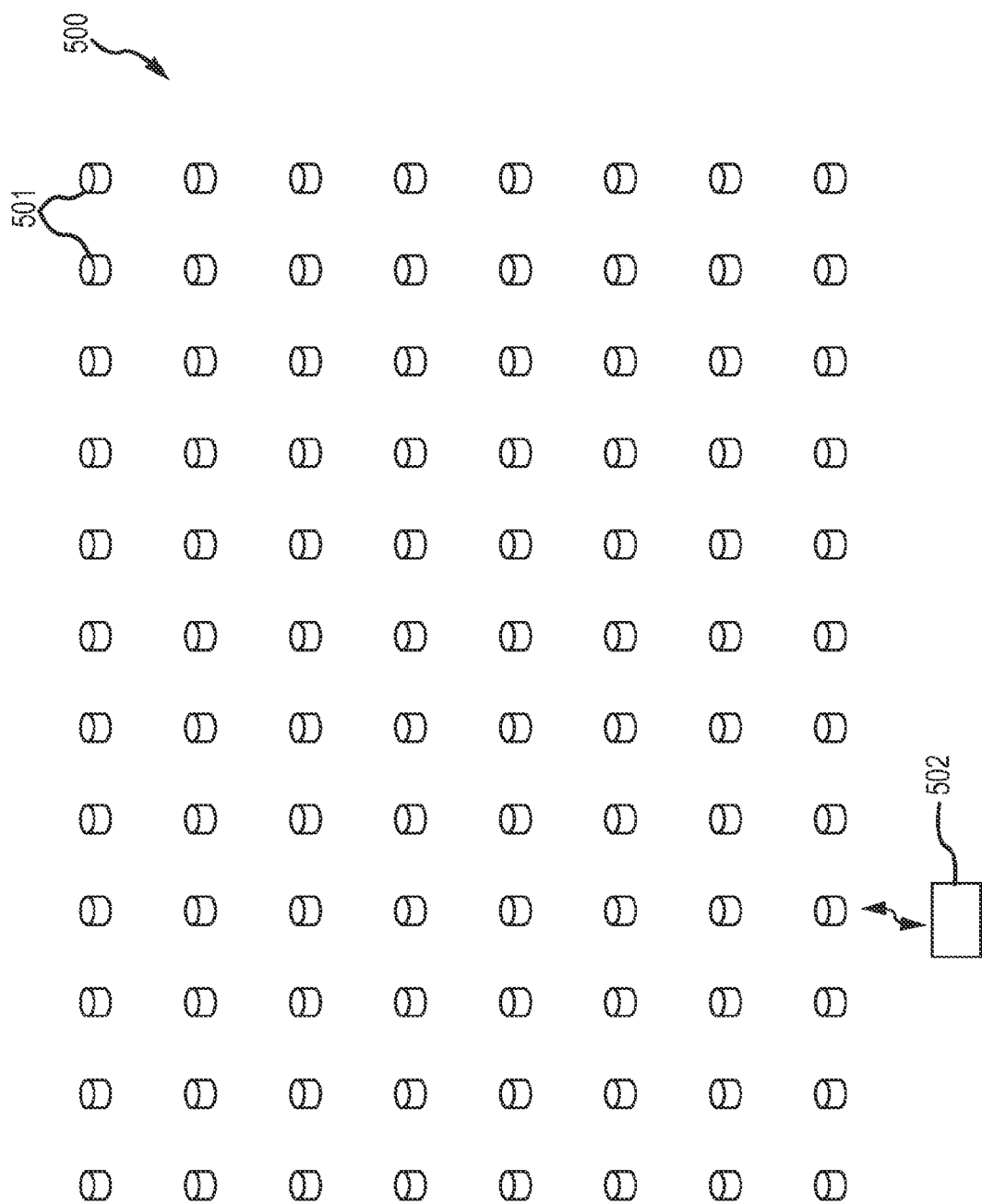
FIG. 5 illustrates a nodal seismic array as can be implemented in accordance with the present invention.

FIG. 5 illustrates a nodal seismic array 500 that can be utilized in practicing the present invention. The illustrated array 500 includes a number of nodal seismic units 501 that can be arranged in substantially any pattern. The nodal seismic units 501 include seismic sensors and associated circuitry as generally described above. However, the nodal seismic units 501 do not include cable outputs or wireless antenna for outputting seismic data in a remote reporting mode. Instead, the nodal seismic units 501 include memory for storing seismic data over a time period. For example, seismic data may be stored at the nodal seismic units 501 throughout an entire survey or for a portion thereof.

Data may be collection from the nodal seismic units 501 by a portable data collection unit 502. The data collection unit 502 may collect data from the array 500 on a unit-by-unit basis either via near field communications (e.g., using a data collection wand that is brought in proximity the unit to be uploaded) or via a physical port (e.g., by establishing a USB, Ethernet, or other connection between the data collection unit 502 and nodal seismic unit 501 for uploading data). Alternatively, the nodal seismic units 501 of the array 500, or a removable memory device from each nodal seismic unit 501, can be retrieved for uploading at a central location. A removable battery and memory device is described in U.S. patent application Ser. No. 12/834,693, which is incorporated herein by reference. Any removable or integrated memory device with sufficient capacity for the desired survey application can be utilized in accordance with the present invention.

It will thus be appreciated that seismic surveys may employ a variety of array configurations, readout pathway configurations, and readout modes. All of these array contexts and combinations thereof can be implemented employing multimode arrays and/or multimode units as discussed below.

II. Multimode Contexts

There are a number of contexts in which multimode arrays may be utilized. These include arrays where two or more readout modes are used substantially simultaneously or in overlapping time periods, e.g., where different readout modes are used at different units of the array to process seismic data corresponding to a single seismic event. Such arrays are a subset of multimode arrays and are referred herein as "hybrid arrays." Examples of hybrid arrays are illustrated in FIGS. 6-10 below. In other cases, a given array or a portion thereof may operate in a first readout mode during a first time period or with respect to a first seismic event of a seismic survey and operate in a second mode, different from the first readout mode, in a second time period or with respect to a second seismic event of the seismic survey. These arrays are also a subset of multimode arrays and are referred to herein as "adaptive arrays." Examples of adaptive arrays are shown in FIGS. 11A-14 below. It will be appreciated that an array may be both hybrid and adaptive. For purposes of illustration, these are generally described below as involving two output modes, but it will be appreciated that three or more output modes may be employed in an array in any of these contexts.

Moreover, it would possible, at least in theory, to implement hybrid arrays and other multimode arrays using single mode seismic units. That is, the multimode functionality could be achieved by switching out single mode seismic units or providing a cluster of two or more seismic units, potentially with coordinated operation for data synchronization and the like, at desired array locations. However, it will be appreciated that the multimode seismic units described below provide great advantages in these contexts.

Figure 6:
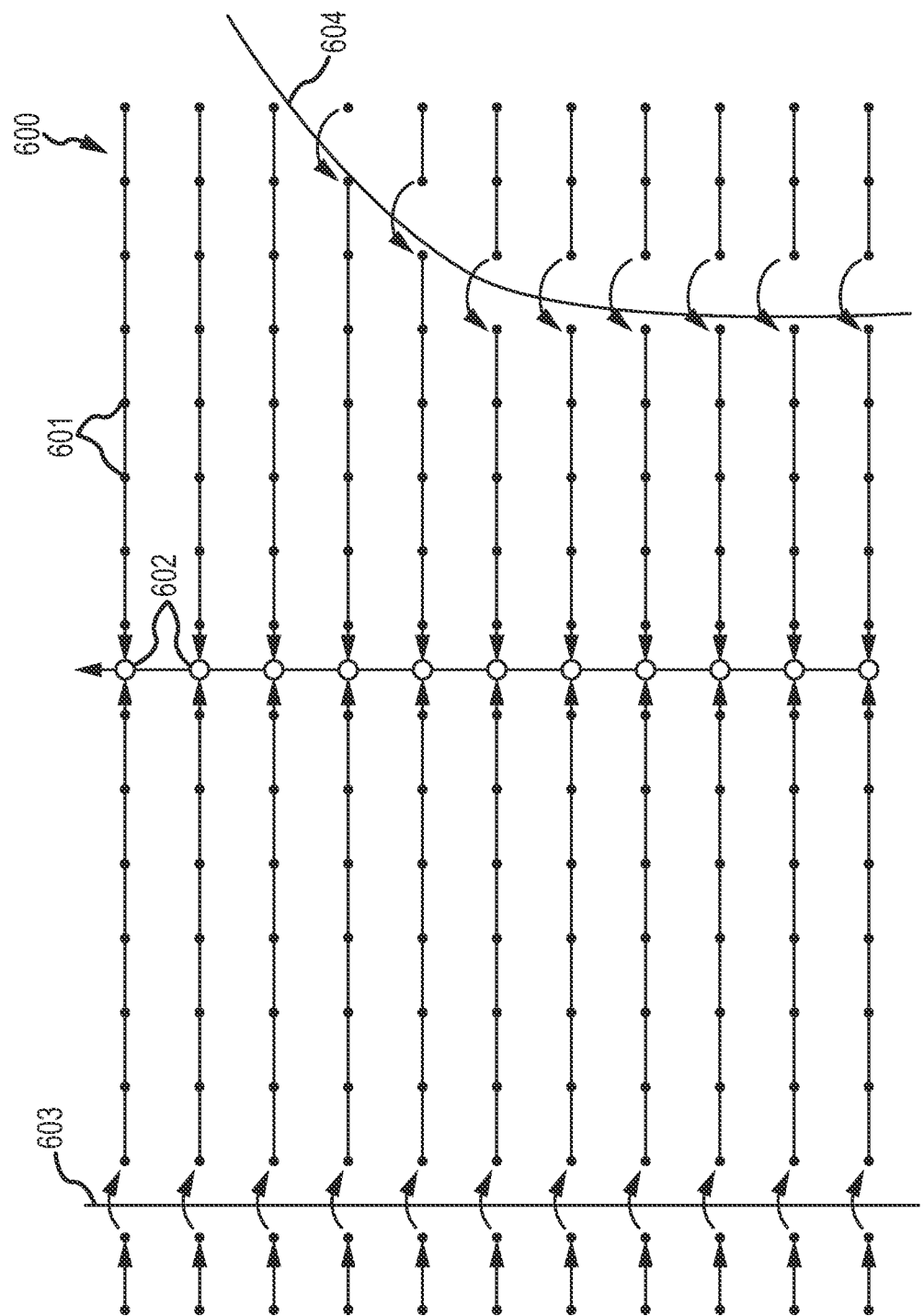
FIG. 6 illustrates a multimode wireless/cabled array in accordance with the present invention.

FIG. 6 illustrates a hybrid array 600 composed of seismic units 601 operating in cable and wireless modes. More specifically, the array includes seismic units 601 arranged in serial data transfer lines to transmit seismic data to line-taps 602. The line-taps 602 may then transfer data to a central collection and processing unit (not shown).

As noted above, one potential difficulty of cabled arrays relates to survey areas that are traversed by roads, waterways or other obstructions. In the illustrated example, the hybrid array 600 extends across both a road 603 and a waterway 604. These difficulties are addressed in the illustrated hybrid array 600 by implementing wireless data transfer across those obstructions 603 and 604. Thus, in the illustrated example, the readout mode transitions between cable and wireless within a single data transfer path or line and appropriate data formatting is therefore employed. For example, a common data format may be utilized for all data transfers, whether via cable or wireless, or the data format may be transliterated between a cable format and a wireless format at each transition. It will appreciated that other hybrid cable/wireless array configurations are possible, for example, where each data transfer path to a corresponding line-tap or base station is either entirely cable or entirely wireless.

Figure 7:
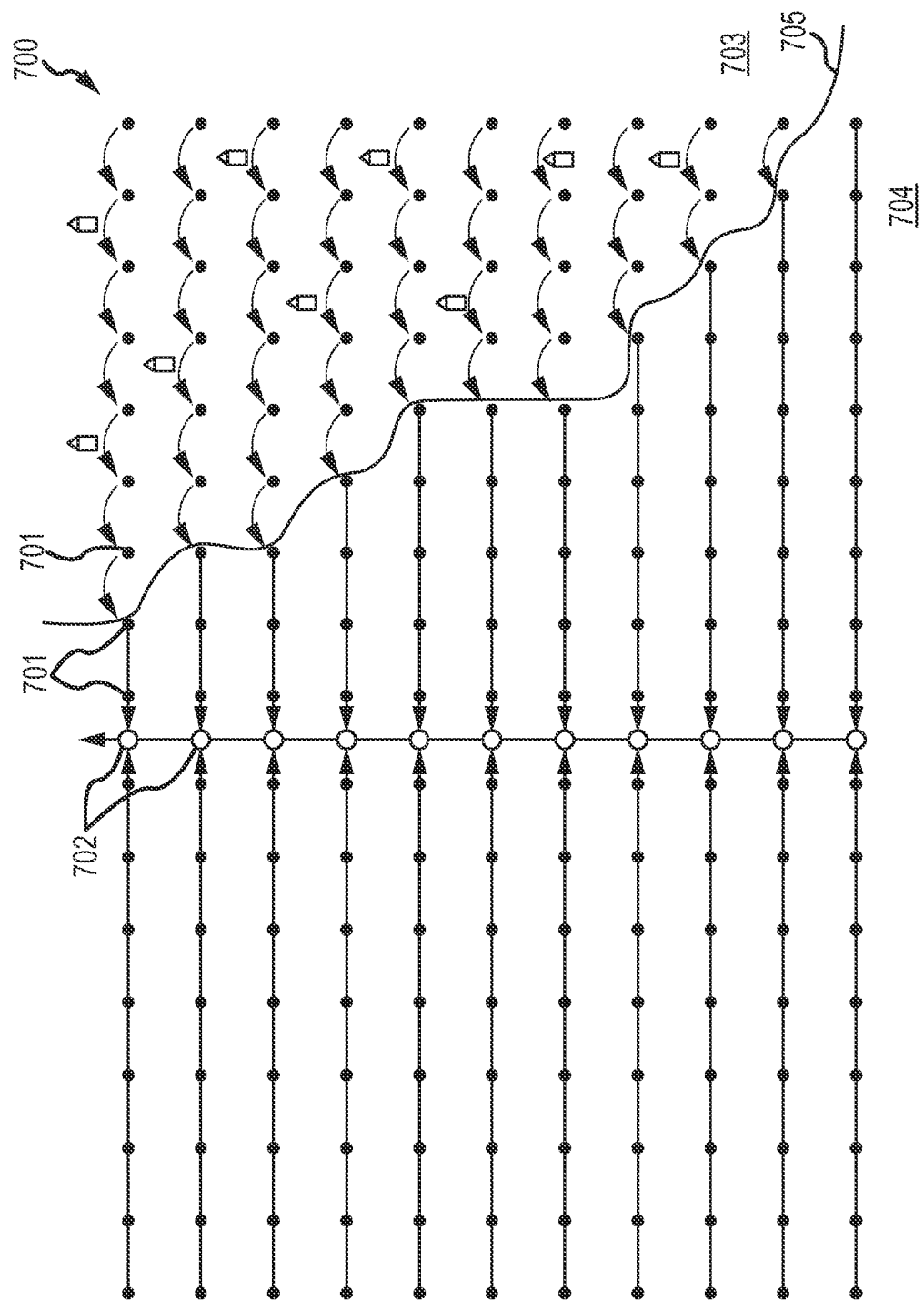
FIG. 7 illustrates an alternative implementation a multimode wireless/cabled seismic array in accordance with the present invention.

FIG. 7 illustrates another context where a hybrid array 700 may be utilized that encompasses both cable readout and wireless readout modes. The illustrated hybrid array 700 extends across both a populated area 703 and an unpopulated area 704. In such cases, a survey operator may choose to employ wireless (wireless and/or nodal) units in the populated area 703 for safety reasons, for convenience, to avoid cable damage, or due to legal or contractual constraints. Where the operator prefers a remote reporting readout mode operation, for example, to avoid operating in blind or partial blind mode, a hybrid array employing cable and wireless readout modes may be employed.

FIG. 7 illustrates such an array 700. In particular, the illustrated array 700 includes a number of seismic units 701 arranged in lines. Seismic data is transferred from unit-to-unit down a line to a line-tap 702. Data is then transferred from the line-taps to a central collection and processing unit (not shown). In the illustrated array 700, all of the data transfers within or extending across the boundary 705 of the populated area 703 are executed in wireless mode. As discussed above, data formatting is addressed to allow for cable and wireless data transfers within a single line. In this manner, the array 700 can be monitored in the same manner that would be possible if the array was fully cabled or fully implemented in wireless readout mode.

Figure 8:
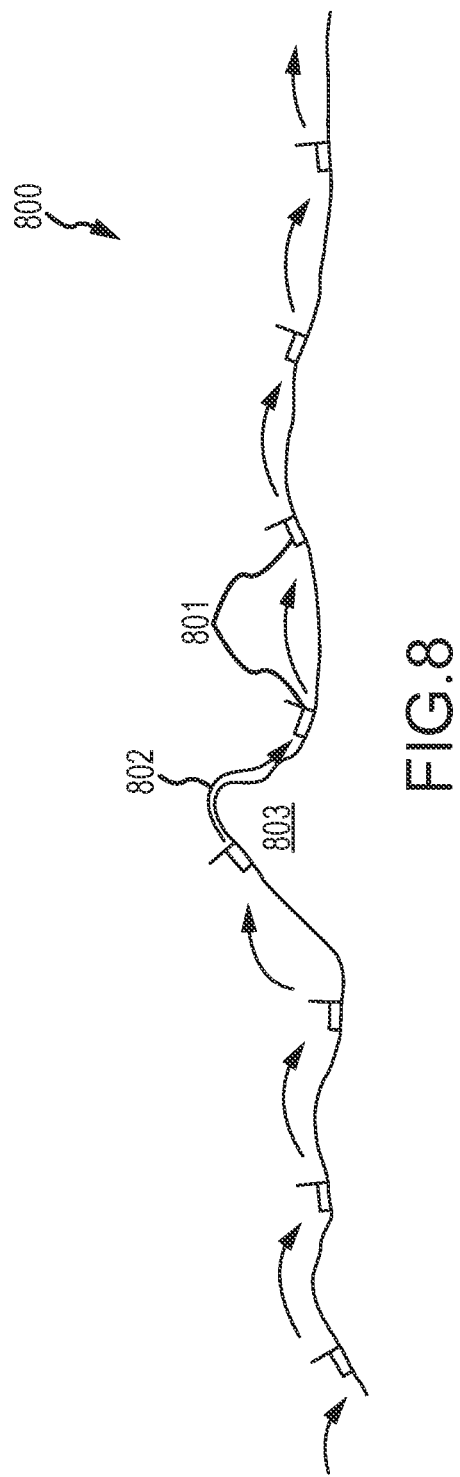
FIG. 8 illustrates a still further implementation of a multimode wireless/cabled seismic array in accordance with the present invention.

FIG. 8 illustrates a still further context in which a hybrid cable/wireless array may be implemented. One reason that serial data transfer paths, rather than parallel paths, may be employed in a wireless seismic array is so that long data transfers are not required. This reduces the transmission power required and conserves battery life. In addition, the short transfer path between adjacent units avoids signal transfer problems due to uneven terrain. Accordingly, in such arrays, uneven terrain is seldom a problem. However, in the event that extreme terrain conditions were perceived to pose a problem for wireless readout mode operation, cabled connections may be employed where necessary.

FIG. 8 illustrates such a case. In particular, FIG. 8 illustrates a line of an array 800 composed of a number of seismic units 801 configured for serial data transfer therebetween. As shown, a cable connection 802 is provided between seismic units 801 at a location of irregular terrain 803. In this manner, the advantages of a wireless array are achieved (e.g., reduced labor requirements and reduced risk of cable damage) without concern about output signal interruptions due to irregular terrain. Again, data formatting is managed to accommodate cable and wireless data transfer within a single line. Although a single line is illustrated in FIG. 8, it will be appreciated that the array 800 may involve multiple lines or other configurations.

Figure 9:
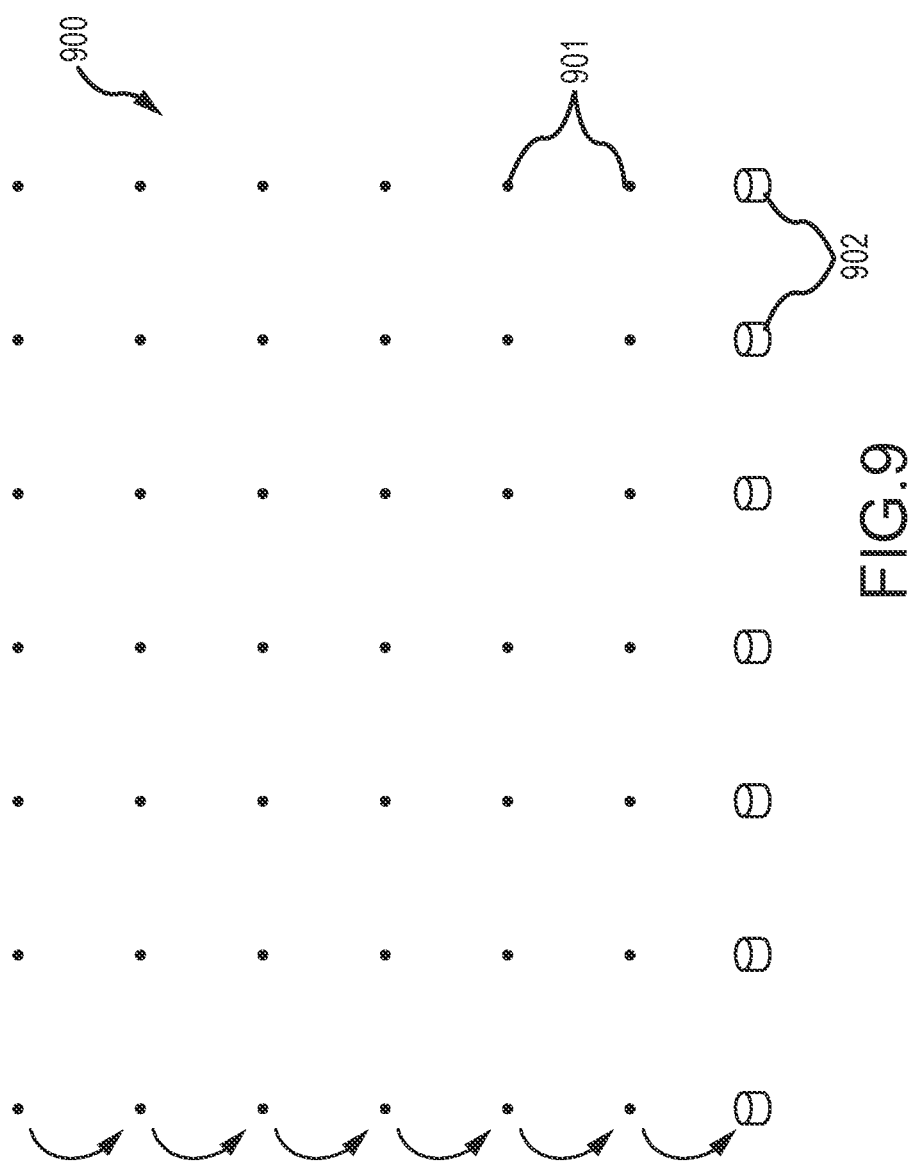
FIG. 9 illustrates a multimode wireless/nodal array in accordance with the present invention.

FIG. 9 illustrates a hybrid array 900 including remote reporting mode seismic units 901 (wireless or cabled) and nodal seismic units 902. Such an array may be implemented, for example, where blind mode operation is acceptable but it is desired to expedite data collection at the conclusion of the survey or at intermediate data collections times. In particular, in the illustrated array 900, data is transferred in serial fashion between the remote reporting units 901 to an associated nodal unit 902 where the data is stored. When data collection from the nodal units 902 is desired, this can be accomplished as in nodal systems as described above. That is, a mobile collection may be used to upload data from each of the nodal units 902, or the units 902 (or a removable memory device from each unit 902) may be collected for uploading at a central location.

Figure 10:
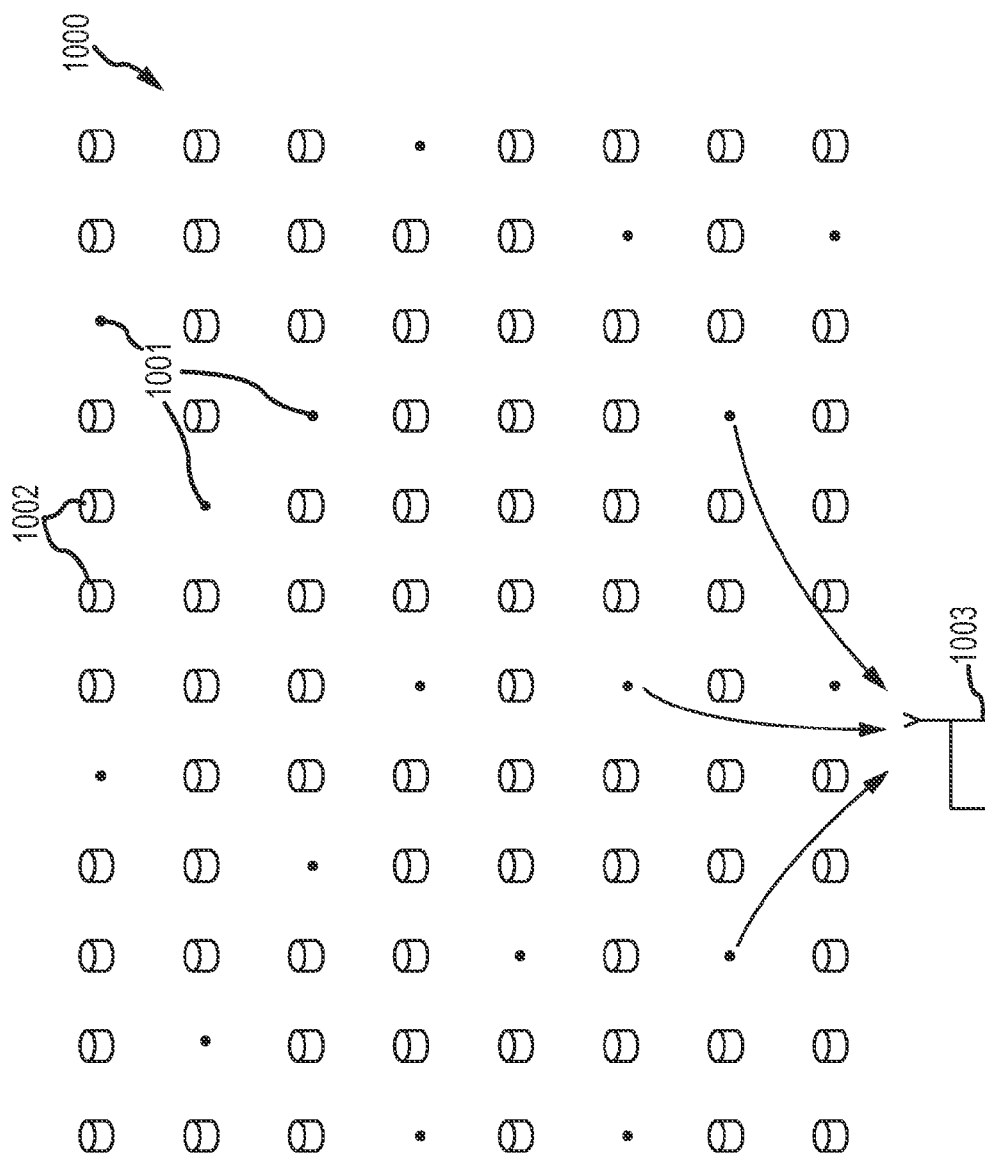
FIG. 10 illustrates an alternative implementation of a multimode wireless/nodal seismic array in accordance with the present invention.

FIG. 10 illustrates a further hybrid array 1000 employing both remote reporting mode units 1001 (wireless and/or cable units) and nodal units 1002. As discussed above, one potential difficulty of nodal systems is that the survey is generally conducted in blind mode. That is, the survey is by conducted without the ability to monitor the array during the survey to identify any problems (e.g., malfunctioning units or unsuitable seismic data). In the illustrated array 1000, remote reporting units 1001 are distributed across the array and provide some ability to monitor the array 1000. For example, the number and positions of the remote reporting units 1001 may be selected to provide a statistical sampling of the performance of the array 1000. Moreover, in the case of an array implemented in multimode seismic units as described below, the illustrated configuration need not be static. Rather, the particular units operating in remote reporting mode and the numbers of such units may be dynamically varied to improve monitoring. In the case of wireless units, the units can report directly, or via serial data transfer paths, to one or more base stations 1003.

FIGS. 6-10 thus provide a number of examples of hybrid seismic array contexts. It will be appreciated, however, that many other hybrid array contexts are possible. Such hybrid arrays may continuously operate in a given hybrid configuration or may transition between modes over time, thus defining further types of multimode arrays as described below.

III. Other Multimode Arrays

FIGS. 11A-14 illustrate a number of examples of other multimode array contexts, in these cases, adaptive arrays. These further adaptive arrays are distinguished from the hybrid arrays described above in that different output modes are used at different or discrete times or with respect to different seismic events. However, it should be appreciated that the hybrid and the adaptive or other multimode arrays are not mutually exclusive. That is, a given array may be a hybrid array in that (for example) different output modes are used simultaneously or with respect to a single seismic event, and may also be an adaptive array in that different output modes are used by individual units or different combinations of output modes are utilized in the array at different times or other respect to different seismic events of a survey. The arrays described in this section may be conveniently implemented using multimode units as described below, but could also be implemented, at least in theory, using single mode units.

Figure 11A:
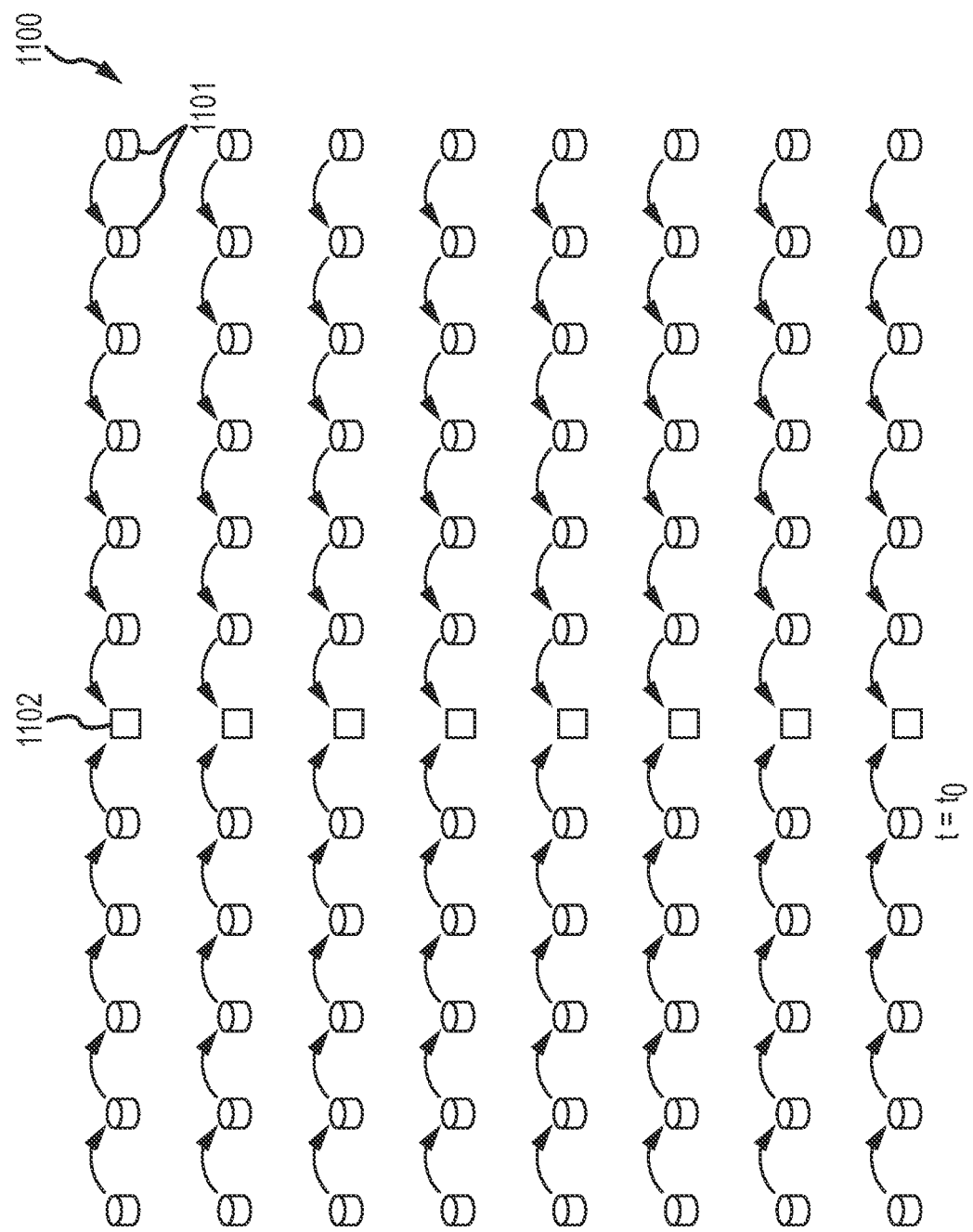
FIGS. 11A-11B illustrate an array where certain seismic units switch from wireless readout to nodal mode during a survey in accordance with the present invention.
Figure 11B:
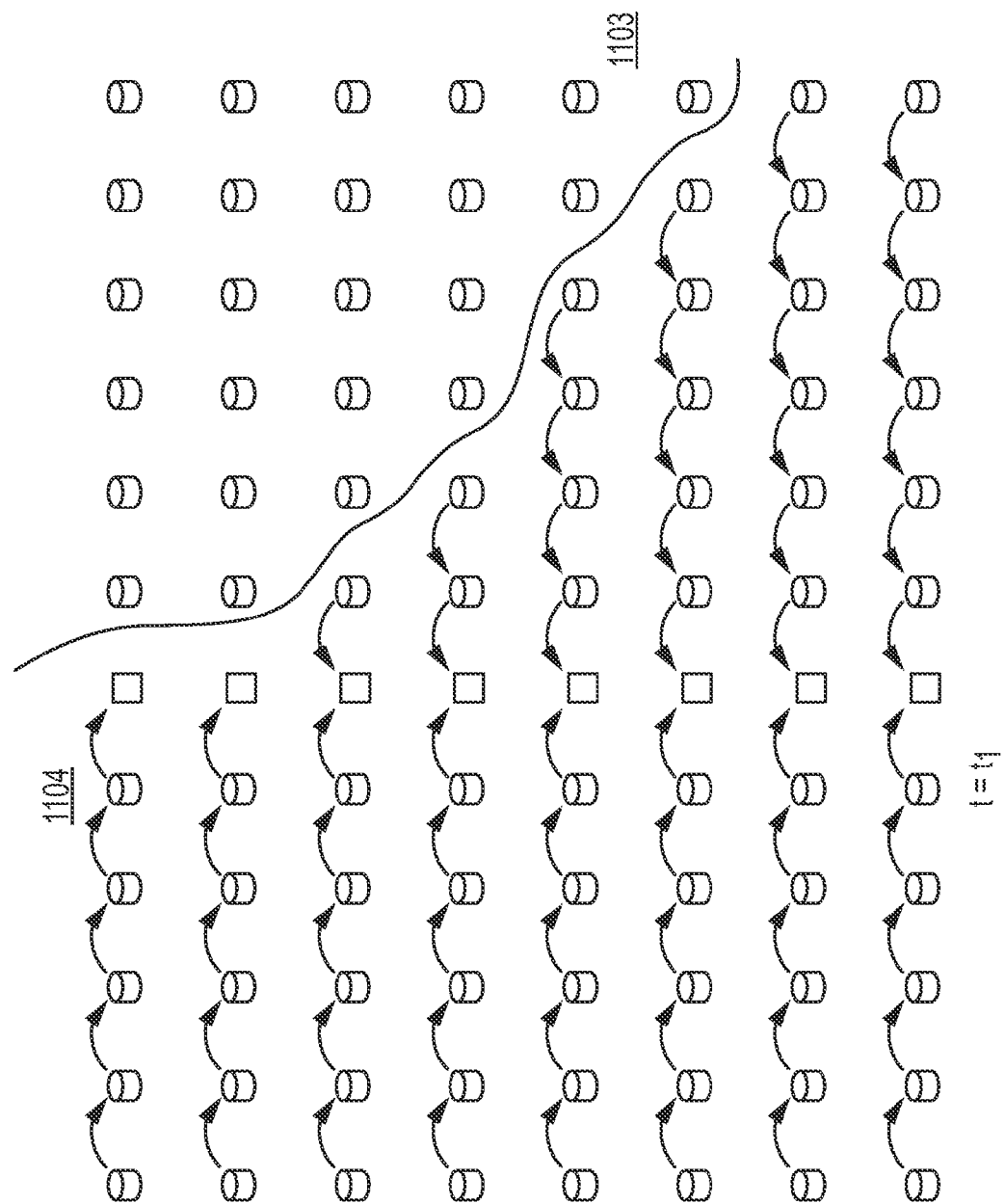

FIGS. 11A and 11B illustrate a first multimode array context where remote reporting units are utilized (e.g., throughout the array) at a first time ($t=t_0$) as shown in FIG. 11A and non-remote reporting or nodal units are utilized at second time ($t=t_1$) as illustrated in FIG. 11B. More specifically, the array 1100 includes a number of seismic units 1101. The units 1101 are arranged in lines for serial data transfer to a line-tap or a base station 1102. The base stations 1102 may, in turn, transfer data to central data collection and processing unit (not shown).

In FIG. 11A, at time $t_0$, the array 1100 is configured for remote reporting mode operation. By contrast, in FIG. 11B, at $t_1$, a first portion of the array 1103 is configured for nodal readout mode operation whereas a second portion of the array 1104 continues to operate in remote reporting readout mode. For example, this may be desired due to potential radio interference in area 1103 at time $t_1$, because of regulatory restrictions, or for other reasons (for example, because it is desired to read out different types of data in different modes, e.g., quality control data in a remote reporting mode and seismic survey data in a nodal mode). In addition, the time periods during which area 1103 operates in nodal mode may be predefined, e.g., in accordance with an operating program, or may be dynamically determined, e.g., based on measurements of radio interference or monitoring of seismic data.

Figure 12A:
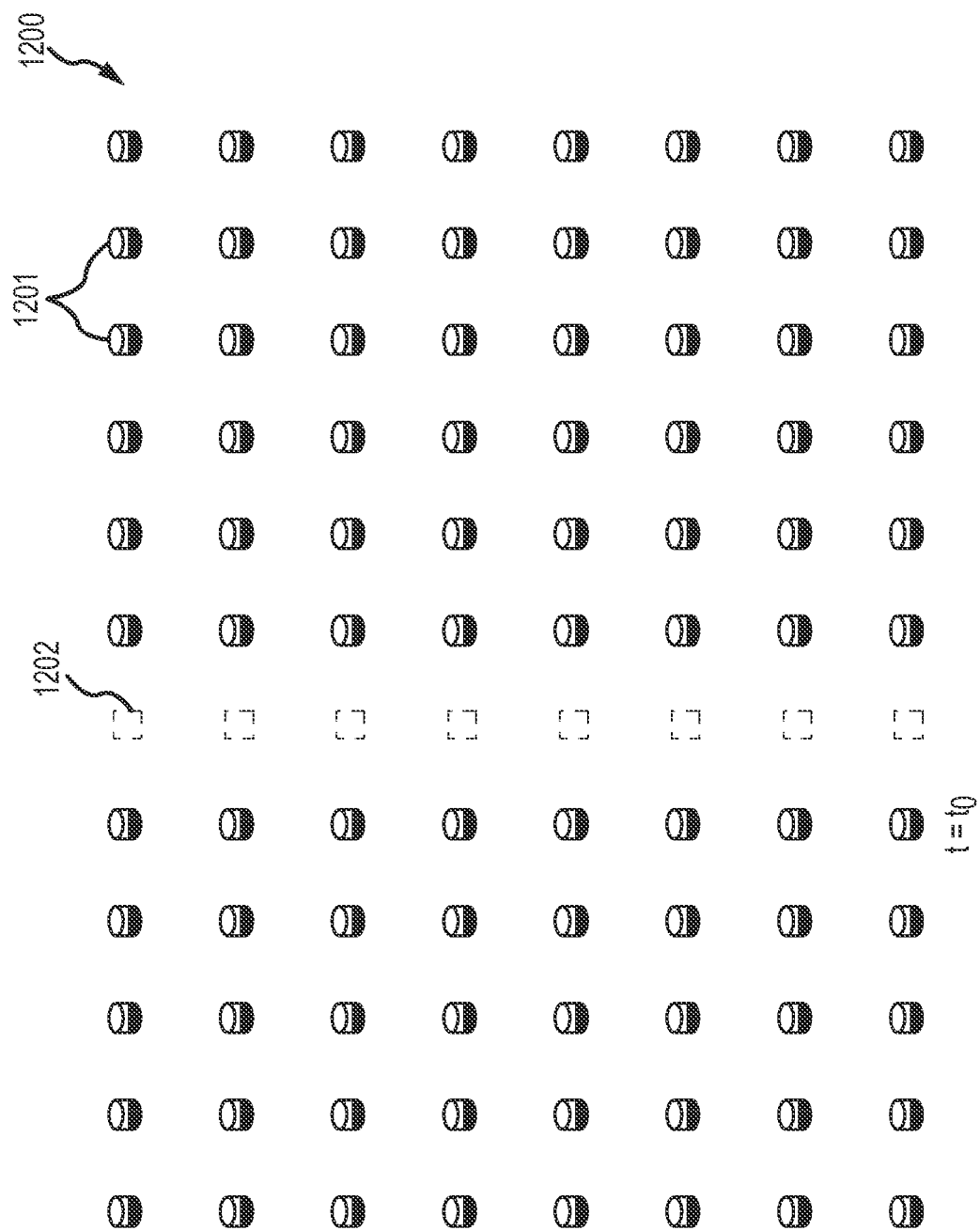
Figure 12C:
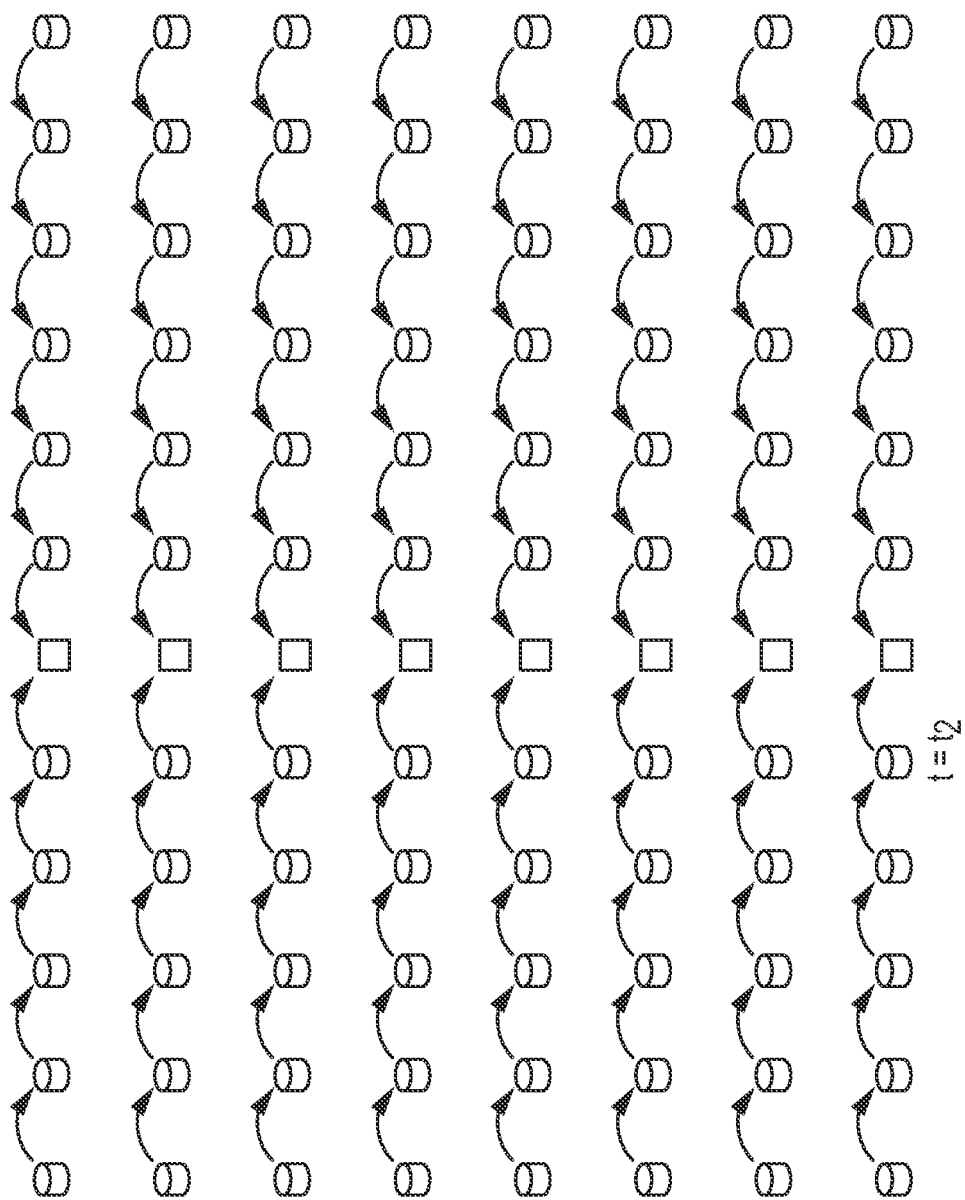

FIGS. 12A-12C illustrate a further context of a multimode array 1200 that successively utilizes nodal and remote reporting (wireless or cable) readout modes. The illustrated array 1200 includes a number of seismic units 1201 arranged in lines where each line is associated with a line-tap or base station 1202. As shown in FIGS. 12A and 12B, the units 1201 may be operated in nodal mode over a period of time, for example, encompassing a series of seismic events. Specifically, FIG. 12A shows the array 1200 at time $t=t_0$, where an initial quantity of data has been obtained at each seismic unit 1201. FIG. 12B shows the array 1200 at a subsequent time $t=t_1$, where additional data has been accumulated. At a subsequent time $t=t_2$ as shown in FIG. 12C, the seismic units 1201 of array 1200 transition to remote reporting readout mode. Accordingly, data, in this case accumulated over multiple seismic events, is serially transferred along each line to base station 1202. Data can then be read out from the base stations 1202 to a central data collection and processing unit (not shown).

A multimode array such as shown in FIGS. 12A-12C may be utilized for a variety of purposes. For example, such operation may be desired to satisfy both the desire to limit the required memory capacity at each seismic unit 1201 while also reducing the total transmissions required from seismic units 1201 so as to conserve battery life. Such operation also alleviates concerns related to operation in blind mode. Such operation may also be utilized in connection with the rapid source event or salvo shooting technique described in U.S. Patent Application Ser. No. 61/621,925, which is incorporated herein by reference in its entirely. Briefly such salvo shooting involves executing a series of seismic events before seismic data from the first event in the series is processed. This may be conducted, for example, to avoid delay in execution of the survey due to read out and/or processing latency. A still further context in which such a multimode array may be utilized is where it is desired to execute wireless readout mode only at certain times or certain times of the day. For example, this may be done to minimize radio interference or maximum available bandwidth. It will be appreciated that the remote reporting readout mode (wireless or cable) may be conducted at regular intervals or on any other desired basis.

Figure 13B:
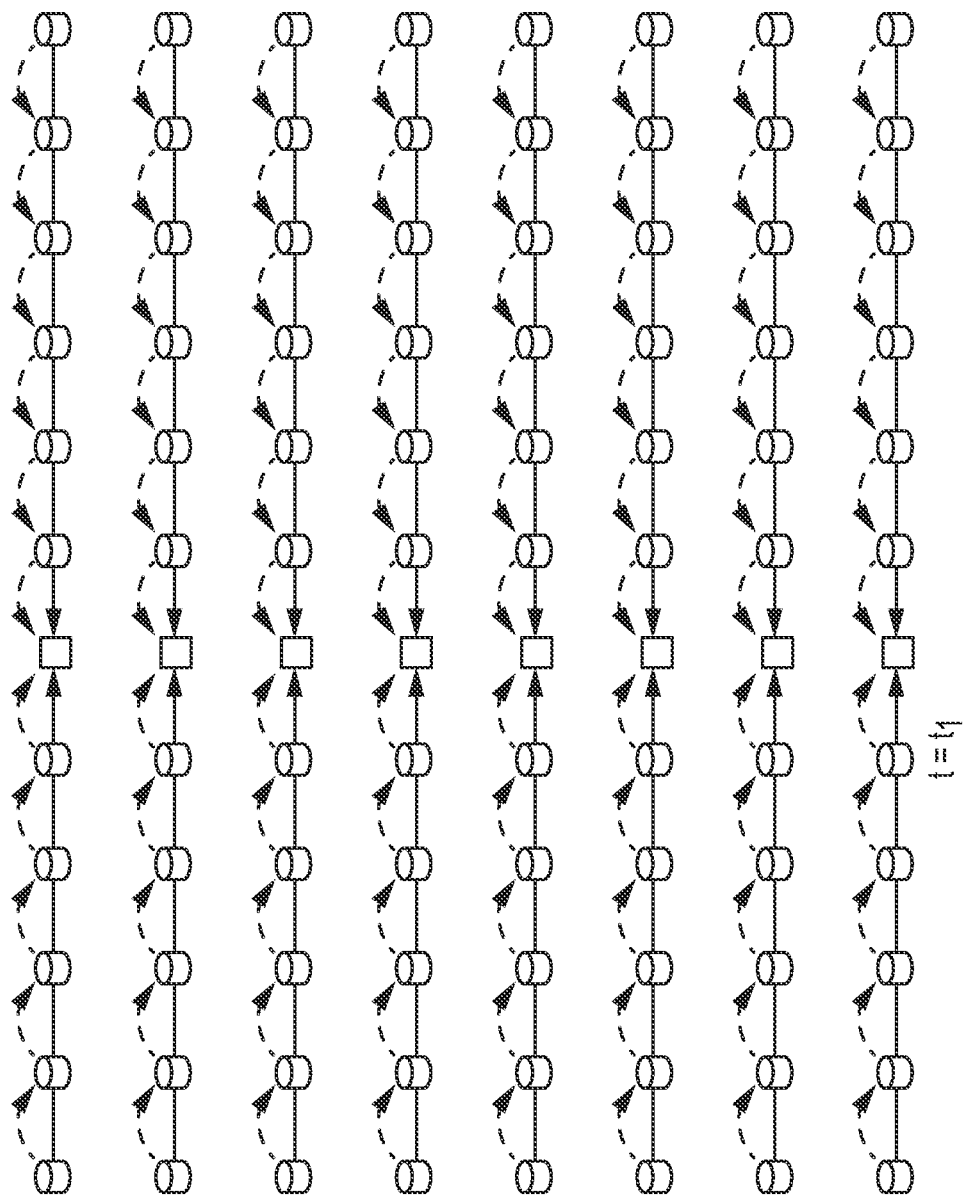

FIGS. 13A and 13B illustrate a still further context of a multimode array 1300 that involves alternate and/or overlapping wireless and cable readout modes. The illustrated multimode array 1300 includes a number of seismic units 1301 arranged in lines for serial data transfer. Each of the lines is associated with a line-tap or base station 1302. The base stations 1302 may, in turn, transfer data to a central data collection and processing unit (not shown). The illustrated seismic units 1301 are capable of operation in both wireless and cable modes. In this regard, each of the seismic units 1301 may be a multimode unit or may include multiple single mode units.

As shown in FIG. 13A, at a first time $t=t_0$, the seismic units 1301 operate in a wireless mode. At a subsequent time, $t=t_1$, as shown in FIG. 13B, the seismic units 1301 operate in cable mode. Formatting of the seismic data is managed, as described above, in such a manner so as to enable appropriate handling regardless of the mode of operation.

Such a multimode array may be implemented for a variety of reasons. For example, there may be times where wireless readout mode operation is problematic due to radio interference, legal or contract limitations, or other reasons. The illustrated array 1300 allows for continuous remote reporting operation in spite of such limitations. As a further example, cable mode operation may be desired in order to avoid battery life concerns or other concerns related to of wireless readout mode operation. However, wireless mode operation may be utilized as a back-up in the event of cable damage. As a still further alternative, wireless readout mode operation may be utilized continuously with the cable supplying timing information and power.

Figure 14:
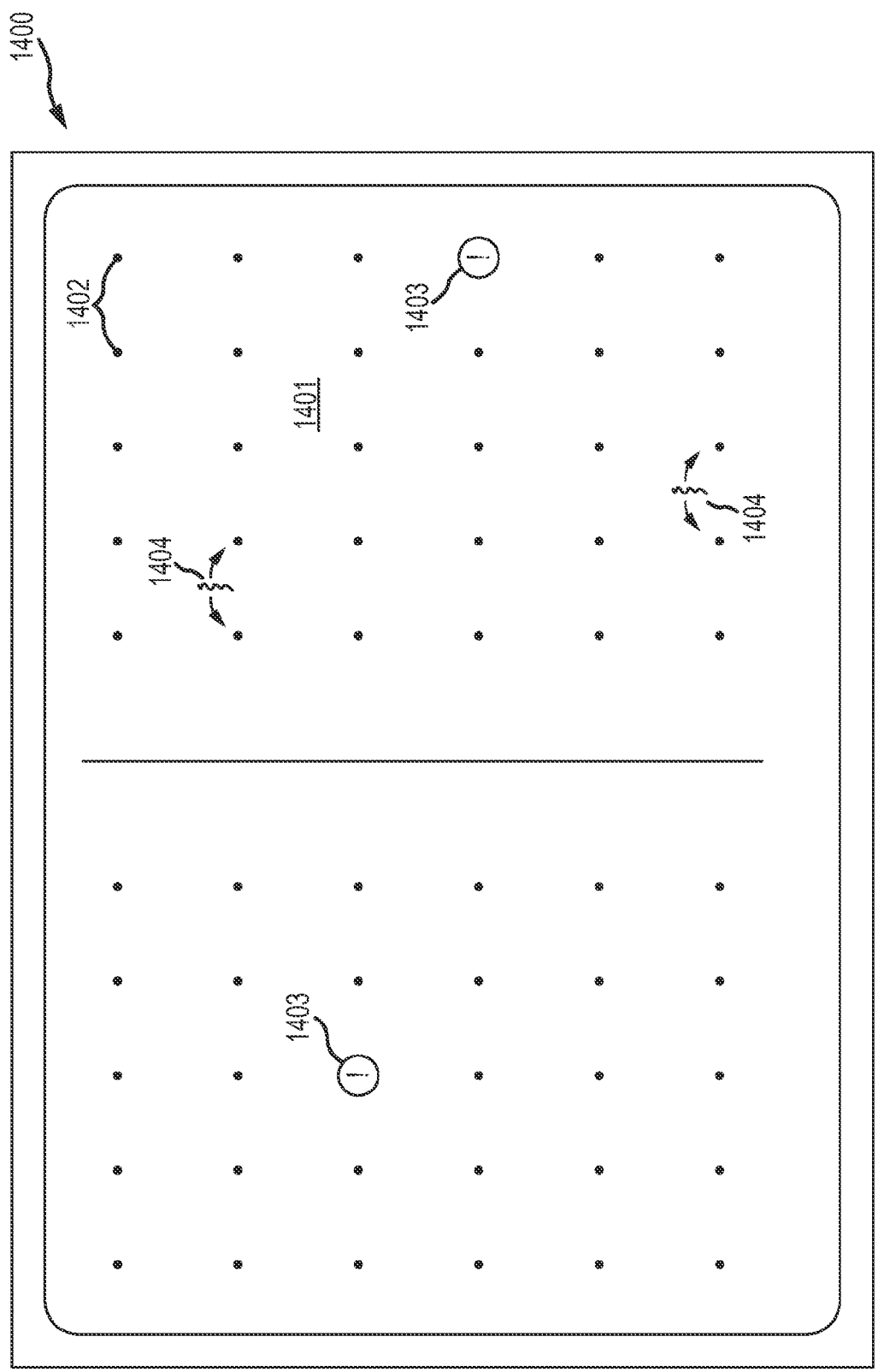
FIG. 14 is a graphical user interface illustrating a process for using wireless readout mode to remotely troubleshoot an array in accordance with the present invention.

FIG. 14 shows a user interface associated with a testing and troubleshooting process that may be implemented in a multimode array. For example, such a testing and troubleshooting system may be utilized in the context of a multimode array involving nodal and remote reporting (wireless or cable) readout modes. It may be desired to monitor operation of individual units, data transfer links, and data quality at the beginning of or periodically during a survey. For example, individual units may be programmed to implement certain diagnostic tests when they are placed in operation or at other times during the survey. An example of such a unit is described in U.S. patent application Ser. No. 12/651,125, which is incorporated herein by its reference. Similarly, tests may be conducted to ensure that data is properly transferred between units, in the case of a serial data transfer path implementation, and to ensure that the quality of the received seismic data satisfies certain criteria. Such tests may be conducted at individual units, at a subset of the units, at a base station, and/or at a centralized or remote location.

In any event, the results of such tests may be reported via a graphical user interface or by any other suitable system. FIG. 14 illustrates a graphical user interface 1400 depicting an array 1401 including of a number of seismic units 1402. The interface 1400 may provide a number of graphical elements to indicate potential problems such as a first graphical element 1403 to indicate a potential malfunctioning unit, a second graphical element 1404 to indicate a potentially malfunctioning communications link, and a third graphical element (not shown) indicating concerns regarding the quality of the seismic data.

As noted above, these tests may be performed and the results thereof may be provided at the initiation of a survey and/or periodically during the survey. It will be appreciated that such a system may be utilized in connection with a multimode array involving wireless and nodal modes. In particular, the wireless transmission capabilities of such units may be utilized to report diagnostic information or seismic data to a central location during an initial time interval or periodically during a survey. This information can be analyzed to provide the diagnostic and troubleshooting information as illustrated in FIG. 14. At the same times or at other times, the array may be operated in nodal mode. In this manner, certain advantages of nodal mode operation, such as battery conservation, can be achieved while also achieving advantages of wireless operation such as real-time monitoring of the array and seismic information during the survey.

While the hybrid and multimode arrays thus described can, at least in theory, be implemented using single mode seismic units many advantages are obtained by employing multimode units in these contexts. Examples of such multimode units and systems for control of the same are described in the following sections.

IV. Multimode Units

As will be appreciated from the discussion above, it is often desired implement seismic arrays using different output modes from one survey to the next, in different areas of a given survey, or even at the same array position at different times during a survey. Any of these objectives can be achieved, at least in theory, by using multiple single mode seismic units. However, it will be appreciated that this may be difficult or impractical in many cases, particularly in the case of multimode arrays where it may be desired to switch between output modes at a given position of an array one or more times during a given survey. In such cases, implementing the survey using multiple single mode seismic units would not only require redundancy of equipment, but also some mechanism for coordinating operation of the single mode units, such as time reference synchronization. Even in the case of using different output modes in different surveys, a large amount of equipment is required to accommodate these different operating contexts, and processing logic for accommodating the different types of arrays may be required. Accordingly, the present inventors have recognized the importance of providing a multimode seismic unit to accommodate a variety of operating contexts.

Figure 15:
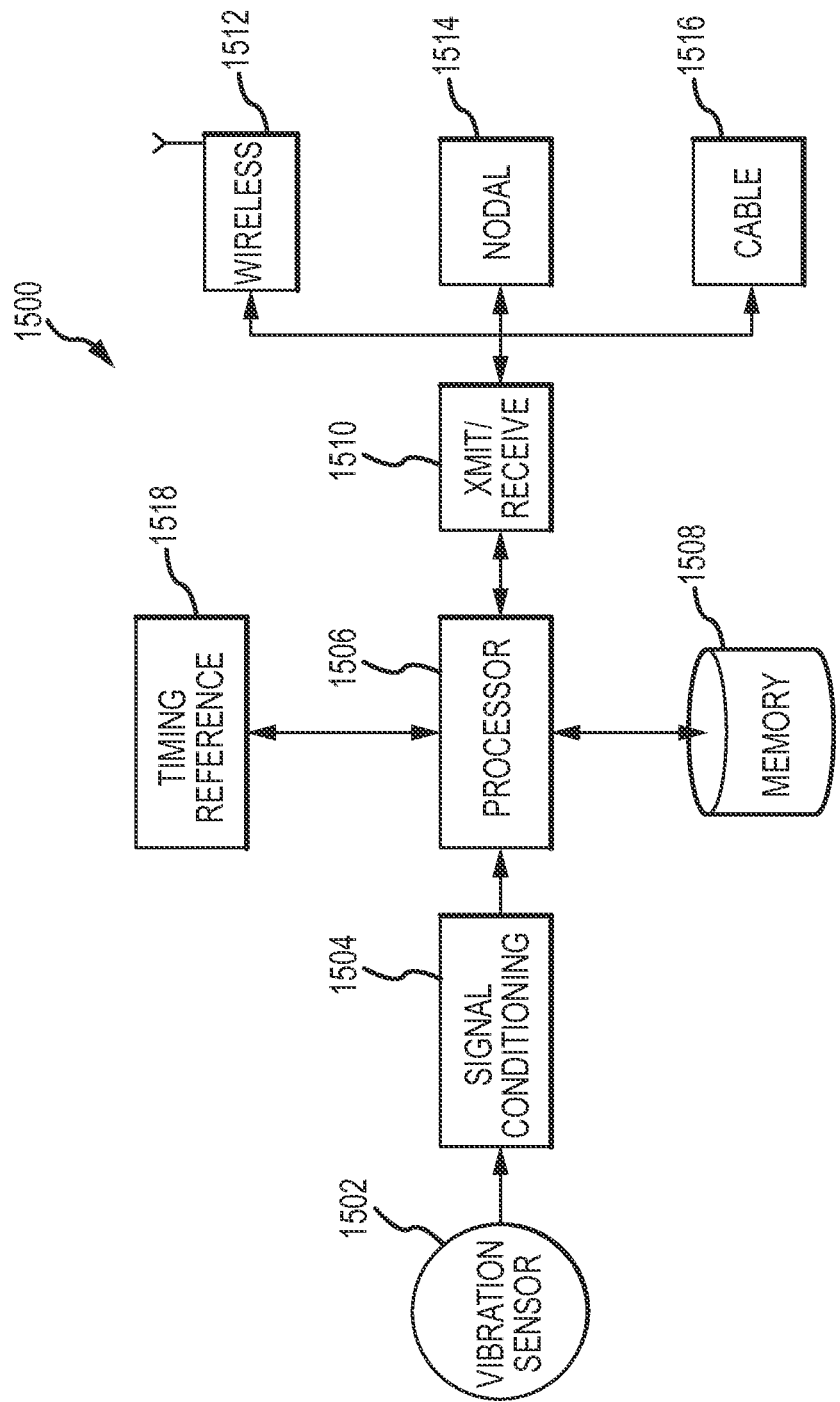
FIG. 15 is a schematic diagram of a multimode seismic unit in accordance with the present invention.

FIG. 15 is a block diagram illustrating an embodiment of a multimode seismic unit 1500 in accordance with the present invention. In particular, the unit 1500 accommodates operation in wireless, nodal, and cable output modes, as well as combinations thereof. The multimode seismic unit 1500 includes a vibration sensor 1502 that converts vibrations, that travel through the ground and are incident on the vibration sensor 1502, into electrical signals. The electrical signals are fed through signal conditioning components 1504 to a processor 1506. The signal conditioning components 1504 may include components for amplifying the signal, converting the signal from analog to digital, filtering the signal and performing any other desired functions to yield a signal appropriate for use by the processor 1506. The digital data from the signal conditioning modules 1504 may be fed into the processor 1506 or directly into a digital memory 1508. Alternatively, in the case of a vibration sensor 1502 with direct digital output, the signals may flow directly to the processor 1506 or digital memory 1508.

In addition to controlling the system and storing the data in memory, the processor 1506 may perform various calculations or processes on the data including decimation, filtering, stacking records, correlating records, managing timing, etc. The processor 1506 may also receive external information, as will be described below, including for example: timing information, cross-correlation reference signals, acquisition parameters, test and programming instructions, location information, seismic data from upstream units and updates to the software among other commands. Such information may be received at the vibration processor 1506 via the transmit/receive module 1510 and one or more of the input/output modules 1512, 1514, and 1516. Additionally or alternatively, the processor 1506 may receive inputs from a timing reference module 1518 including, for example, GPS components for provisioning time reference information from the GPS constellation or other a similar constellation or reference time system. In this regard, the timing reference module 1518 may provision time reference information or may provision raw time reference data for calculating time reference information at the processor 1506. The timing reference information may be used, for example, to time stamp seismic data so that the seismic data can be correlated with other seismic data obtained at other units across the array. Depending on the array implementation, absolute time reference information may be independently resolved at each unit, e.g., via independent GPS discipline at each unit, may be provisioned from a central time reference provisioning module, or may be generated at certain units and provisioned to immediate or remote neighboring units. Moreover, the timing reference information may be provided continuously or periodically during the survey.

In the illustrated array 1500, the processor 1506 may also perform a number of functions incidental to the multimode nature of the illustrated unit 1500. In this regard, the illustrated unit 1500 includes a wireless module 1512, a nodal module 1514, and a cable module 1516. In the case of wireless operation, the unit 1500 may receive array configuration information, timing information, and seismic data, among other things, from other units in the array. In certain implementations, the processor 1506 may append current seismic data from the vibration sensor 1502 to the seismic data received from one or more other seismic units and transmit the resulting collection of seismic data with different seismic unit identifiers and different time stamps to one or more downstream seismic units. The processor 1506 may perform a number of formatting and data management functions in this regard. The wireless module 1512 may include one or more RF antennas, frequency management logic and software and associated electronics.

In the case of nodal mode operation, the processor 1506 will typically store seismic information from the vibration sensor 1502 in the memory 1508 during the survey. Depending on this specific implementation, the processor 1506 may also receive interrogation signals from an upload unit and retrieve seismic data from the memory 1508 in response to the upload interrogation signal. In other implementations, e.g., involving a removable memory device, such uploading may be managed by logic of an external system. In other cases involving multimode operation, the processor 1506 may store seismic data in the memory of 1508 and then periodically retrieve data from the memory 1508 to be output, for example, via the wireless module 1512 or cable module 1516. In still other cases, involving switches from remote reporting output to nodal operation, the processor 1506 may process mode selection signals and direct seismic data to the memory 1508 in response thereto. It will be appreciated that the processor 1506 may also reformat data depending on the mode of operation. The nodal module 1514 may include a short range transceiver from receiving interrogation signals from an upload unit and transmitting seismic data in response thereto, as well as associated electronics. Alternatively, the nodal module 1514 may include USB, Ethernet, optical fiber or other ports for establishing a physical connection to upload seismic data or download signals as desired.

The cable module 1516 is operative for transmitting and receiving timing and other operation information, as well as seismic data. In this regard, the cable module 1516 may include physical cable connections, which may be detachable as described below, as well as associated electronics. The transmit/receive module 1510 is operative to coordinate communications between the processor 1506, on the one hand, and the modules 1512, 1514 and 1516 on the other. In this regard, the unit 1500 may operate in any one of wireless, nodal, or cable mode at any time, or may operate in combinations thereof. For example, it may be desired to provide output in remote reporting mode and to also store the same output information in memory 1508. The transmit/receive module 1510 can manage traffic so as to avoid data conflicts and properly direct information in relation to any or all of these output modes. The module 1510 may be embodied as logic running on the processor 1506 or may be provided as a separate logical unit.

In accordance with the present invention, a multimode unit preferably includes a selector for selecting the desired modes of seismic data transmission. Such selectors may be embodied as physical mode selection switches disposed on each individual unit, software mode selection switches associated with each individual unit (including a graphical user interface or other element for allowing mode selection by user) and/or mode selection logic that can be accessed from a centralized or remote location (e.g., at the survey site or via a wide area network such as the internet) for controlling individual units, collections of units or the entire array.

Figure 16:
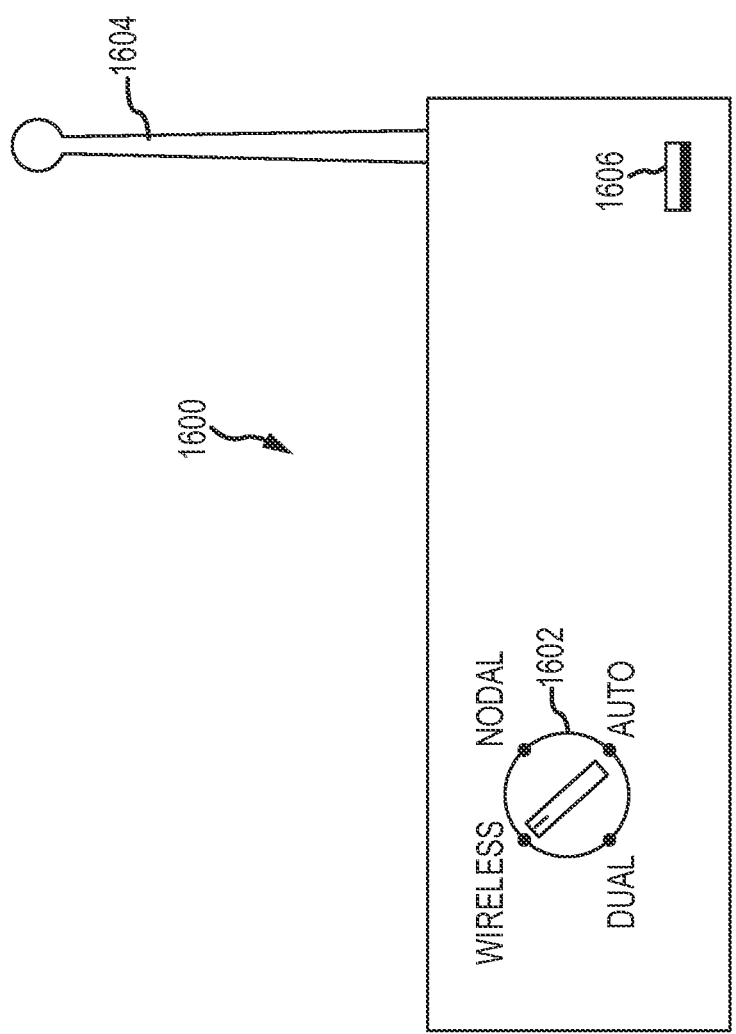
FIG. 16 is a front view showing a multimode seismic unit in accordance with the present invention.

FIG. 16 shows an example of a multimode seismic unit 1600 including a physical mode selector switch 1602. In this case, the mode selector switch 1602 allows for manual selection of output modes including wireless, nodal, dual mode, or automatic selection. In the wireless mode, seismic data is provided only in wireless mode until another mode is selected by operating the selector switch 1602. Similarly, in nodal mode, seismic data is provided only in nodal mode until a different mode is selected using the selector switch 1602.

In dual mode, output is provided both in wireless mode and nodal mode. That is, seismic data is output wirelessly and the same seismic data is stored in an internal memory of the unit 1600. In automatic mode, the processor of unit 1600 elects to operate either in wireless mode or in nodal mode depending, for example, on predefined specifications. For example, such specifications may determine the times or conditions for which each mode is selected. Times of operation in each mode may be predetermined, for example, based on legal or contractual constraints on wireless transmissions. Alternatively, the unit 1600 may periodically measure conditions related to noise, bandwidth availably, or the like and then select whether or not to operate in wireless mode based on associated parameters or thresholds.

The illustrated unit 1600 further includes an antenna 1604 and a data port 1606. The antenna 1064 may be used for RF transmissions in wireless mode or to periodically upload data (e.g., to a portable collection unit) in the case of nodal operation. The antenna 1604 may also receive seismic data or other information from a base station or other units and may receive interrogation signals from an upload unit during nodal operation. The data port 1606 may be used, for example, for uploading data in nodal mode and/or for interfacing with external devices as may be desired.

It will be appreciated that the illustrated unit 1600 may include a variety of additional or alternative features. For example, the unit 1600 may include a removable memory and/or battery pack. Such a pack can be switched out in the field to replenish battery power and retrieve seismic data. Multiple such packs may be provided on a single seismic unit in order to enable hot-swapping of individual packs. The unit 1600 may further include power cord ports for recharging, power switches and the like. The data port 1606 may be, for example, a USB port, Ethernet port, a serial data port, an optical fiber port or any other physical communications interface.

Figure 17:
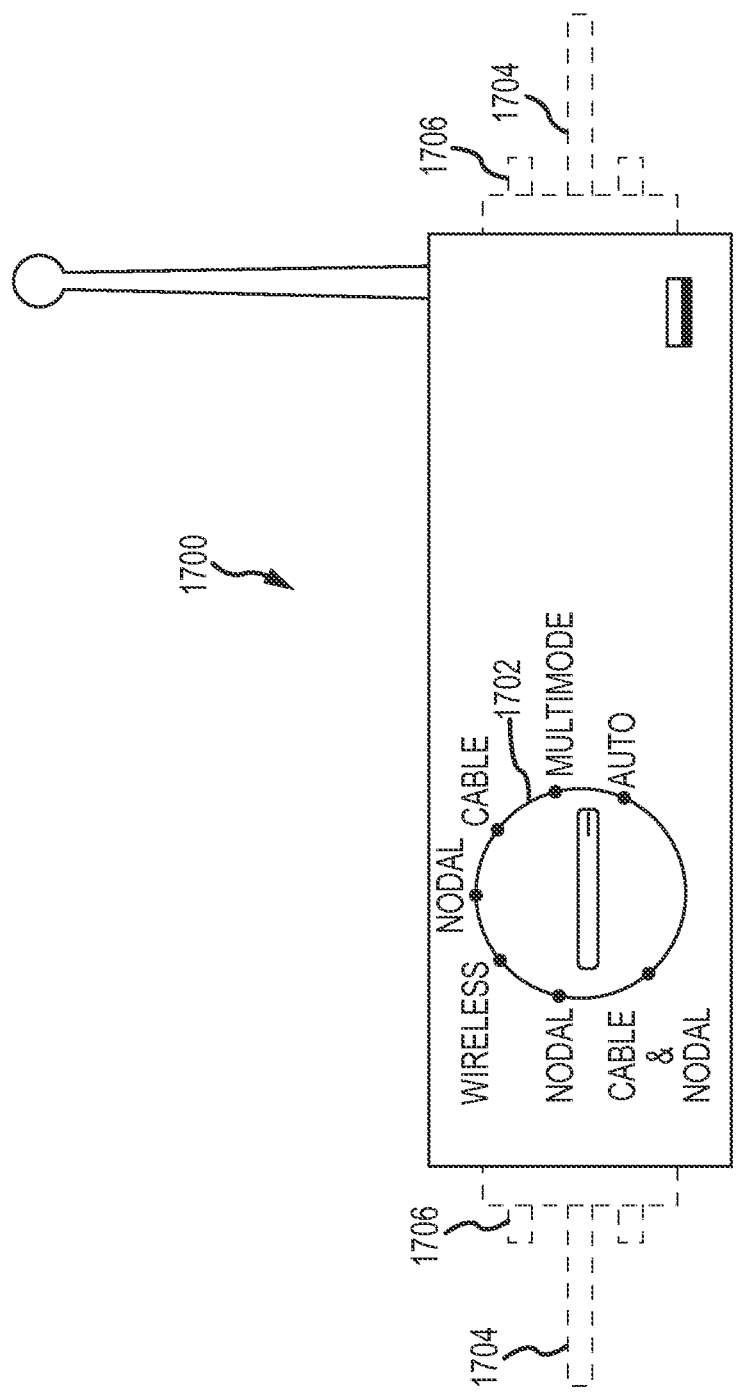
FIG. 17 is a front view showing an alternative implementation of a multimode wireless unit in accordance with the present invention.

FIG. 17 shows an alternative embodiment of a multimode seismic unit 1700. The multimode seismic unit 1700 may generally include all of the components described above in connection with FIG. 16, and includes some additional features which are described below. The illustrated multimode seismic unit 1700 includes a mode selector switch 1702 that provides additional output options in relation to the embodiment of FIG. 16. Specifically, the illustrated selector 1702 allows for selection as between the modes: wireless, nodal, cable, multimode, auto select, cable plus nodal, and wireless plus nodal. In each of the modes designated as wireless, nodal and cable, the multimode seismic unit 1700 outputs seismic data only in the designated mode until a different mode is selected using the selector 1702. In the selector position designated as "wireless+nodal" seismic data is output in both wireless and nodal modes. Similarly, in the selector position designated "cable+nodal" seismic data is output via cable mode and in nodal mode.

In the auto select mode, the multimode seismic unit 1700 may automatically select one or more of wireless, nodal and cable operation based on time or operating conditions as generally described above. In multimode mode, the multimode seismic unit 1700 may operate in any one or more of the multimode contexts described above such as, for example, storing seismic data in nodal mode and periodically outputting the data in wireless or cable mode according to predefined parameters or opportunistically, based on monitored conditions.

The illustrated multimode seismic unit 1700 may further include ports for receiving detachable cables 1704 and locking mechanisms 1706—such as screws, clips, or the like—for securing the cables 1704. In some cases, the output mode options that include cable output may not be desired. For example, some surveys may be executed without using cables in order to reduce labor requirements and the need for expensive cabling. Conversely, when cable is desired as an optional mode or the exclusive mode, the cable 1704 can be plugged into the multimode seismic unit 1700 and secured in place using the locking mechanism 1706 so as to avoid malfunctions due to unintentionally decoupled cables. The presence or absence of the cable 1704 may also impact the functionality of the selector 1702. In this regard, the selector positions requiring cable connections may be disabled or a warning may be provided via an LED or other indicator when the cable 1704 is not connected. On the other hand, if desired, the cable mode may be automatically selected when the cables are plugged in.

V. Multimode Controls

While mode selection at the physical unit is simple and practical for many applications, there are many cases where it may be desired to execute mode selection remotely. For example, an operator at central control station at the survey site (e.g., at a work station in a trailer or other temporary unit) may desire to select operating modes based on current operating conditions or the status of the survey. Moreover, such an operator may wish to execute mode selection for the entire array, for a group of units such as a section of the array, or for a number of individually selected units. Central control facilitates such operation. In addition, it may be desired to execute such selection from a location remote from the array site via a wireless network or the internet.

Moreover, such centralized or remote operation of the array is useful for array monitoring, testing and troubleshooting.

Figure 18:
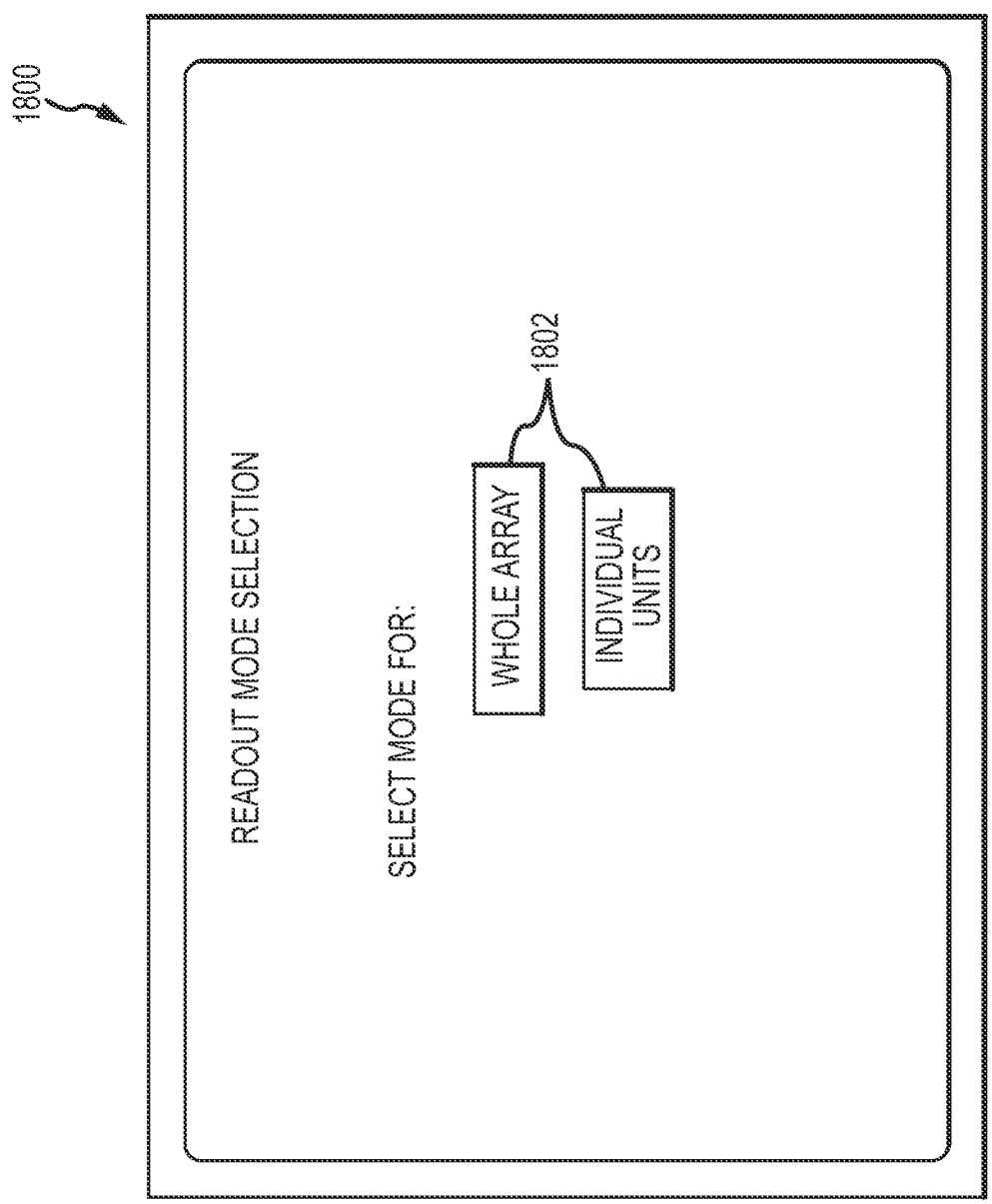
FIGS. 18-20 show graphical user interfaces for use in seismic array readout mode selection in accordance with the present invention.
Figure 19:
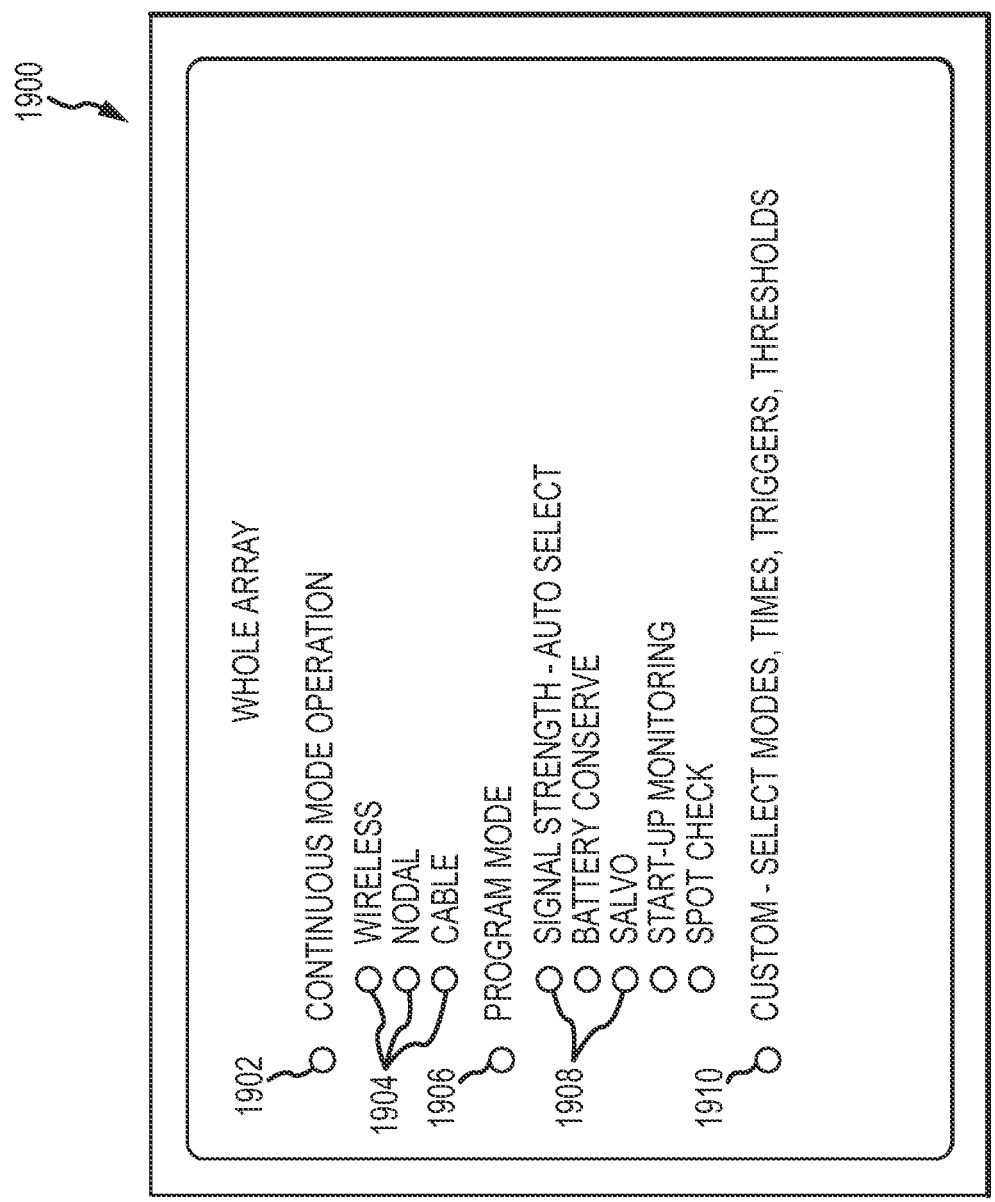
Figure 20:
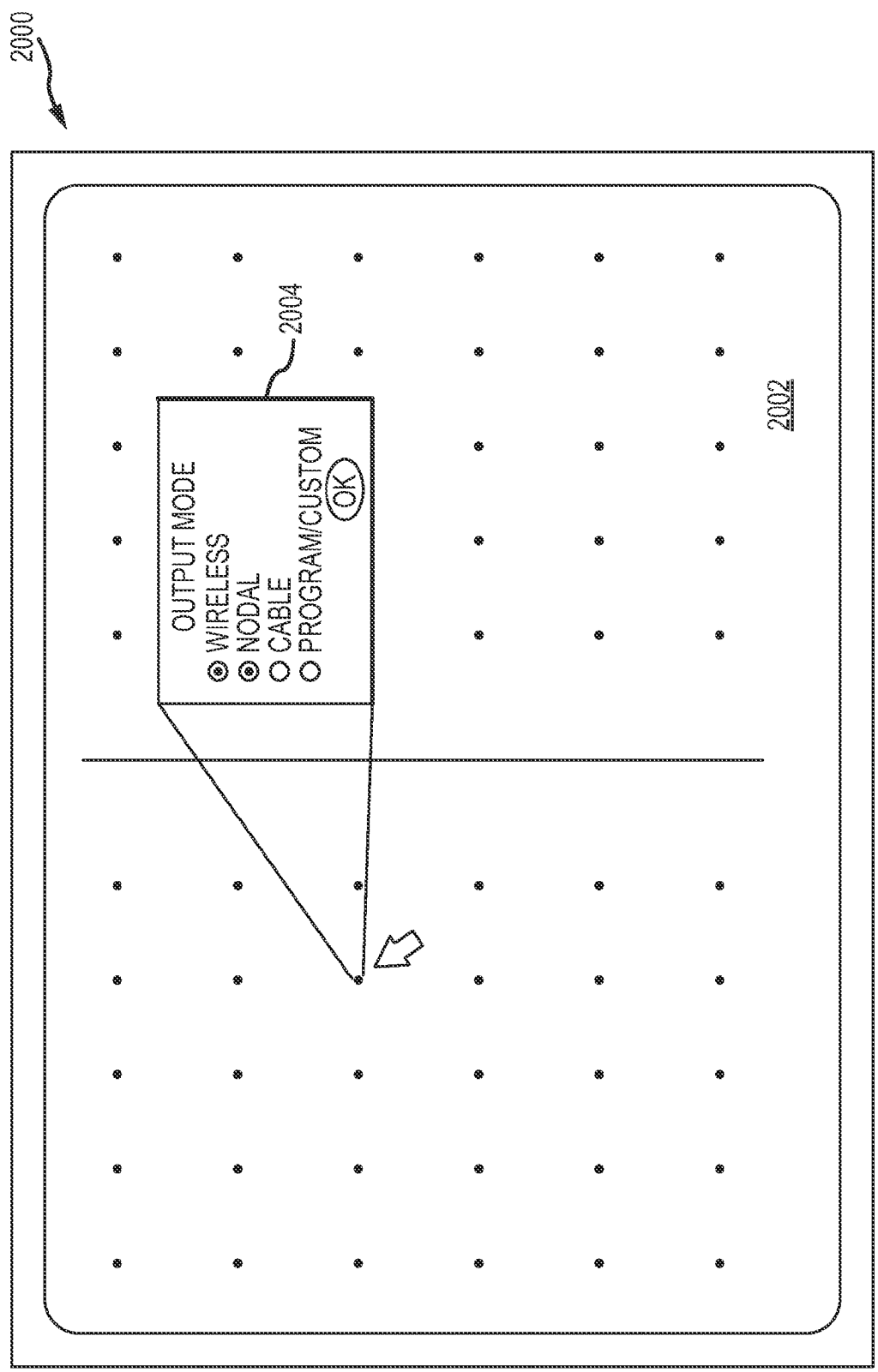

FIGS. 18-20 illustrate user interface screens that may be provided in connection with such centralized or remote control of mode selection. It will be appreciated that a variety of interfaces may be provided in this regard including functionally rich combinations of touch screen elements, pull down screens, pop-up dialog boxes, and the like. The user interface screens shown in FIGS. 18-20 are provided to illustrate centralized or remote mode selection functionality, and are not intended limit the nature of user interfaces that may be supported in such a system in accordance with the present invention.

As noted above, one the advantages of centralized or remote operation is that the operator can conveniently select to control an individual unit, collections of individual units, or the whole array. FIG. 18 illustrates an initial user interface 1800 that may be utilized in this regard. The user interface 1800 includes buttons 1802 that may be selected to allow for operation with respect to the whole array or with respect to individual units, e.g., a specific unit, a line or other area of the array or other set of units selected by the operator.

If the operator selects the whole array button, operation may proceed to a subsequent user interface 1900 such as shown in FIG. 19. When setting the output mode for the whole array, the operator may select to operate the whole array in a continuous mode or modes of operation or the operating mode of the array may change at different times or under certain conditions. As shown in FIG. 19, where a continuous mode of operation is desired, the user can select the continuous mode operation button 1902 and then may select one or more of the supported output modes 1904. In the illustrated example, the supported output modes include wireless, nodal, and cable. A further option to activate or deactivate the selected units may be provided.

Alternatively, the operator may select the program mode button 1906 if one or more predefined programs 1908 are desired. The examples of predefined programs 1908 shown in FIG. 19 include: signal strength auto select; battery conserve; salvo shooting; start-up monitoring; and spot check. The signal strength auto select mode may be selected where wireless output is desired whenever adequate signal strength is available. For example, this program may select wireless output mode whenever all of the units, or a designated number of units, of the array have a signal strength of at least a designated threshold strength. This mode may also take into consideration the available bandwidth and any limitations on use of RF transmissions.

The battery conserve mode may implement predefined operating parameters in order to extend the life of batteries in the individual seismic units. For example, such battery life may be conserved by reducing output transmission powers when appropriate, reducing the frequency of transmissions (by storing data for a period of time before outputting the data), by limiting use of GPS units to acquire position or timing information or implementing any other power saving features.

Salvo shooting generally involves executing a series of seismic events in rapid succession such that multiple seismic events may be executed before seismic data from the first event is processed. This may be done so that the seismic survey is not delayed due to data acquisition and processing latencies. Moreover, in such cases, some data preprocessing, e.g., correlation and stacking, may be conducted prior to transmission of data from the individual seismic units. The illustrated interface 1900 allows such programming to be selected.

The operator may also use the interface 1900 to select start-up monitoring operation. As noted above, it is useful to execute certain tests at the beginning of a survey or periodically during the survey. Such tests may involve monitoring proper functioning of individual units and proper transmission of data between units. If errors are detected in this regard, an operator can dispatch service personnel to repair or replace individual units thus accelerating the start-up process and ensuring that the array functions as desired. The associated start-up procedures may involve running tests, transmitting test results, obtaining and transmitting some initial seismic data for troubleshooting purposes, and the like. The operator can use the start-up monitoring button to initiate such operation or to access monitoring interfaces.

The spot check program can be selected to spot check individual seismic units, individual lines or other subdivisions of the array, or selected units. This may be useful in a variety of contexts. For example, at any time, an operator may wish to monitor the operating health, battery status, available memory or other operating of one or more seismic units. In addition, as noted above, it may be desired to operate an array in a hybrid mode where most units are operating in nodal mode (e.g., for battery conservation) but a statistical sampling of the units are periodically operated wireless mode for monitoring purposes. The spot check program can be used to select units and times for operation in wireless mode for this purpose. Any other predefined programs may be added to this section of the interface 1900.

The illustrated interface 1900 also includes a custom button 1910. In many cases, it may be desired to custom select the modes or sequence of modes of operation for a seismic array or various portions thereof. For example, different modes may be desired for different portions of the array at different times depending on legal or contractual restrictions, conditions that change with time of day or seasonally, or the like. The custom button 1910 can be selected to define such custom mode selection environments. Upon selection of the custom button 1910 a series or screens may be provided to enable selection of modes, times, trigger events, threshold conditions or anything else that may affect or determine output modes for a survey.

Referring again to FIG. 18, the operator may also elect to execute mode selection for individual units. If the operator selects the individual unit button 1802, then a user interface 2000 may be presented as shown in FIG. 20. In the illustrated example of such an interface 2000, the operator may then be presented with a graphical depiction 2002 of the array. This may be implementation as a touch screen or cursor based graphical user interface. In the latter case, the user may move a cursor to identify a particular unit, line or section of the array. Alternatively, the user may drag the cursor over an area of the array to identify multiple units.

Upon identifying one or more units, a menu 2004 may be presented to allow the operator to select an output mode for the unit or units. The options presented on the menu 2004 may be similar to any of the examples provided above including, for example, the ability to select multiple output modes for outputting data pertaining to a given survey or seismic event. It will thus be appreciated that, by using a centralized or remote system as desired in connection with FIGS. 18-20, an operator can conveniently select output modes without the need to visit each individual seismic unit, thereby improving efficiency of operation.

VI. Exemplary Multimode Process

Figure 21:
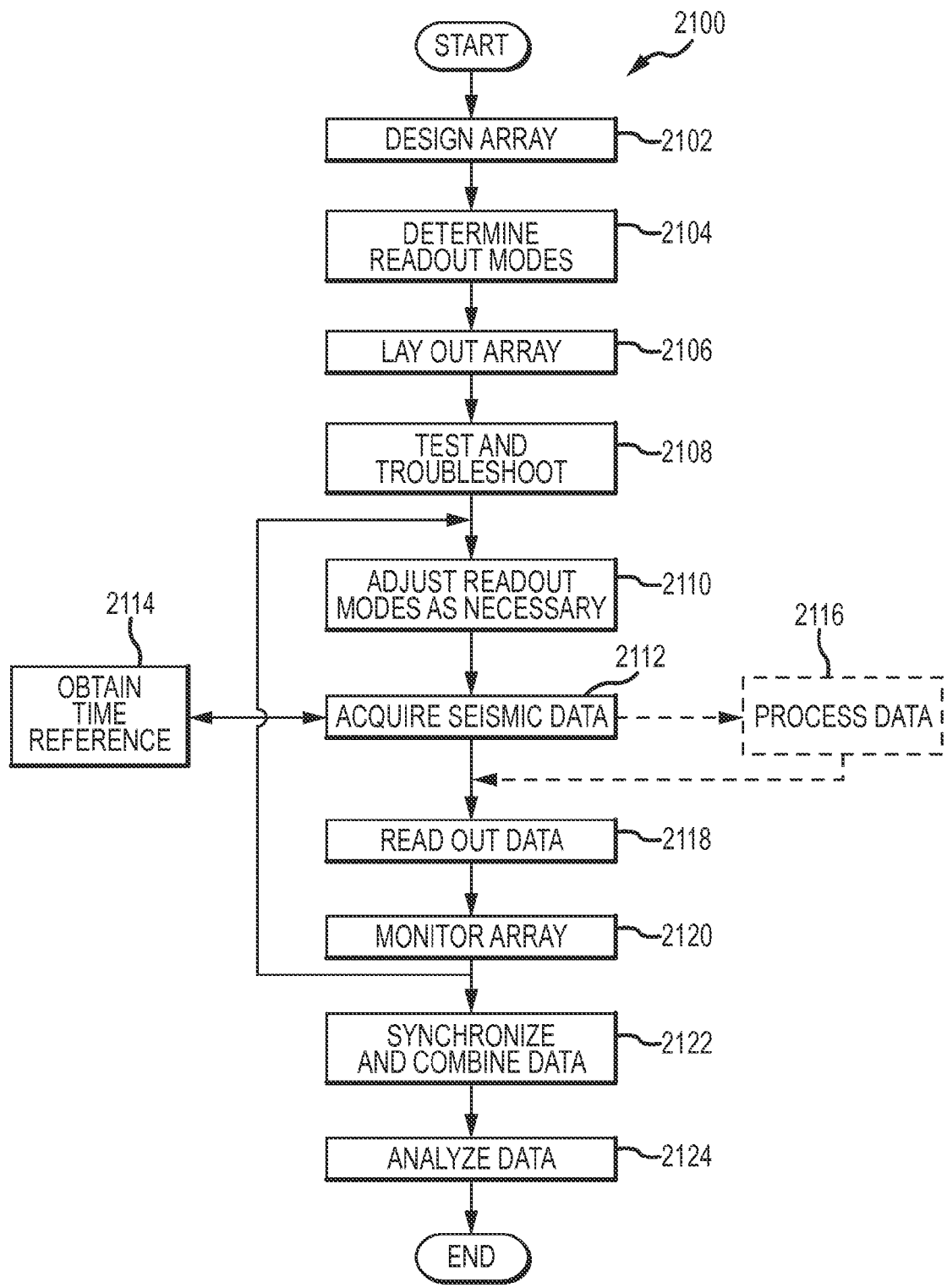
FIG. 21 is a flow chart illustrating a process relating multimode operation of seismic array in accordance with the present invention.

Having thus described a variety of multimode context and multimode seismic units, an exemplary multimode process 2100 will now be summarized with reference to the flow chart of FIG. 21. Based on the discussion above, it will be appreciated that various functionality may be added or omitted the illustrated process 2100 and the sequence of the illustrated steps may be modified depending on the context. It will therefore be appreciated that the process 2100 is provided to illustrate and summarize functionality in accordance with the present invention and is not provided by way of limitation.

The illustrated process 2100 begins with designing (2102) an array for a particular survey application. Many things may be considered in this regard including the topology of the survey site, the seismic information output modes to be utilized, the nature of the survey site including whether it is populated or traversed by roads or waterways, the desired density of seismic units, the desired area of coverage, and the length of time over which the survey will be conducted among other considerations. If not already accomplished, the readout modes are then determined (2104). As will be understood from the description above, this may involve multimode arrays. Thus, the determination of readout modes may not be a static determination but may involve selecting times, selecting portions of the array, selecting threshold conditions for transitioning from one mode to another, etc.

After these initial matters have been considered, it is possible to determine the configuration and equipment that will be required for an array. The array can then be laid out (2106), e.g., by physically distributing appropriate seismic units across the array area. This process may change depending on the nature of the array. For example, cabled arrays and certain wireless implementations may involve carefully positioning the seismic units in lines connected to line-taps. In other implementations of wireless arrays or nodal arrays, the positioning of the seismic units may be somewhat more flexible and may accommodate preferred placing for populated areas and the like. Moreover, for wireless and nodal arrays, laying out of the cabling is, of course, unnecessary.

Once the array has thus been laid out, testing and troubleshooting (2108) of the array may be conducted. In some cases, individual units may be programmed to automatically implement a testing procedure upon placement of the unit or powering-up of the unit. In other cases, a testing and troubleshooting process may be directed from a centralized or remote location. In any event, the testing and troubleshooting results may be utilized to ensure that all units and any necessary connections are functioning properly. In some cases, the results are displayed to a technician at the seismic unit. In other cases, the results may be transmitted to a centralized or remote location for monitoring of the full array.

An operator can then adjust (2110) readout modes as necessary. This may involve selecting a readout mode or program for individual units or the whole array as discussed above. In other cases, this may involve selecting a readout mode based on the results of the testing and troubleshooting. For example, where there is a problem with wireless operation, a line may be reconfigured or a individual unit or set or units may be instructed to operate in nodal mode at least for some length of time.

The array may then begin to acquire (2112) seismic data. In the case of active surveys, this may involve operating vibration machines, weight drops, or charges. In the case of passive surveys this may simply involve instructing the seismic units of the array to begin acquiring data. In conjunction with acquiring seismic data, the individual units will generally obtain (2014) time reference information. The time reference information may be provisioned from an on-board GPS unit or the time reference information may be provisioned from other seismic units or a central clock via wireless or cabled communications. In some cases, some data processing (2116) may be conducted at the individual seismic units prior to reading the data out.

Depending on the mode of operation, seismic data may then be read out (2118) from the seismic units, e.g., in real-time or otherwise during the survey. For example, in the case of wireless arrays and cabled arrays, data may be read out substantially continuously during the survey. In other cases, data may be read out periodically from the array, e.g., wireless, via cables, or by uploading data from individual devices or collecting removable memory devices. In other cases, it will be appreciated that data may not be read out until the conclusion of the survey.

In cases where the seismic units can communicate with a centralized or remote processing station, the array may be monitored (2120) continuously or periodically during the survey. Such monitoring may involve reviewing status information from individual units (battery status, available memory capacity, and any malfunction signals), monitoring the status of communications connections between units, or monitoring the collection or quality of seismic data. Depending on the results of this monitoring, readout modes may be adjusted (2110) as necessary. For example, if a communication connection problem is identified affected units may be instructed to operate in nodal mode.

The seismic data read out from the array can then be synchronized and combined (2122) as desired. As discussed above, the individual shots of data received from the seismic units will generally be associated with metadata indicating the unit that received the information and a time stamp for the information. In this manner, seismic information from different units having the same time stamp may be combined to yield geographically distributed seismic information for a given time. In addition, seismic information corresponding to a given seismic event but having different time stamps may be processed to yield depth information. Moreover, information from one or more seismic events may be used to generate an image identifying subterranean features of potential interest. This data can then be analyzed (2124) for a variety of purposes (such as identifying natural resource deposits, water, faults, or anything else of interest in the context of a particular survey). In some cases, such analysis may be conducted after the conclusion of data acquisition. In other cases, the data may be synchronized, combined and analyzed prior to the conclusion of data acquisition or may be used to modify the parameters of the survey.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A seismic survey system, comprising:
an array of seismic units, each unit including a sensor for receiving seismic signals and providing an output indicative thereof, said array being configured for performing a seismic survey of a survey area;
a first seismic unit of said array operative for receiving a first seismic signal corresponding to a source event of said survey and providing a first output of first seismic information corresponding to said first seismic signal via a first output mode; and a second seismic unit of said array operative for receiving a second signal corresponding to a source event of said survey and providing a second output of second seismic information corresponding to said second seismic signal via a second output mode, wherein said first and second modes differ with respect to transmission modes by which seismic information is read out from said first and second seismic units, respectively;

wherein said first seismic unit is operative to read out said first output via said first output mode and said second seismic unit is operative to read out said second output via said second output mode during a common time period.

2. A seismic survey system as set forth in claim 1, wherein said first and second seismic units are operative to read out said first and second seismic outputs via said first and second output modes, respectively, for a common seismic event.

3. A seismic survey system as set forth in claim 1, wherein said first and second seismic units are operative to read out said first and second seismic outputs via said first and second output modes, respectively, for different seismic events of said survey.

4. A seismic survey system as set forth in claim 1, wherein at least one of said first and second seismic units is a multimode unit capable of providing outputs via each of said first and second output modes.

5. A seismic survey system as set forth in claim 4, wherein said at least one of said first and second seismic units provides outputs via each of said first and second output modes with respect to a single seismic event.

6. A seismic survey system as set forth in claim 4, wherein said at least one of said first and second seismic units selectively provides an output via either said first output mode or said second output mode depending on one or more monitored conditions.

7. A seismic survey system as set forth in claim 6, wherein said monitored conditions include any one or more of available transmission bandwidth, a level of potentially interfering transmissions, a status of a transmission pathway, battery life, memory capacity and an ability to keep up with seismic data acquisition.

8. A seismic survey system as set forth in claim 4, wherein said at least one of said first and second seismic units selectively provides an output via either said first output mode or said second output mode depending on a current time.

9. A seismic survey system as set forth in claim 8, wherein an output mode is selected as a function of time based on one of time-dependent transmission restrictions and a program for defining output mode as a function of time.

10. A seismic survey system as set forth in claim 1, wherein said array utilizes multiple output modes in connection with said survey including at least one remote reporting output mode and a nodal mode.

11. A seismic survey system as set forth in claim 10, wherein said remote reporting output mode is a wireless output mode.

12. A seismic survey system as set forth in claim 10, wherein at least most of the seismic information of said survey from at least most of said seismic units is provided via said nodal mode and at least some of the seismic information of said survey from some of the seismic units is provided via said remote reporting mode.

13. A seismic survey system as set forth in claim 10, wherein at least most of the seismic information of said survey from at least most of said seismic units is provided via said remote reporting mode and at least some of the seismic information of said survey from some of the seismic units is provided via said nodal mode.

14. A seismic survey system as set forth in claim 1, wherein said array utilizes multiple output modes in connection with said survey including at least a wireless output mode and a cable mode.

15. A seismic survey system as set forth in claim 14, wherein said wireless output mode is used in an array area including one of a road, a waterway, a populated area or another potential cable obstruction.

16. A method for use in operating a seismic survey system, comprising the steps:

configuring a seismic array for conducting a seismic survey of a survey area where said array includes at least a first seismic unit;

first operating said first seismic unit to obtain first and second seismic information, corresponding to one or more seismic events of said survey;

second operating said first seismic unit to output said first seismic information via a first output mode;

switching said first output mode of said first seismic unit to a second output mode without physically reconfiguring said first seismic unit; and third operating said first seismic unit to output said second seismic information via a second output mode;

wherein said first and second output modes differ with respect to transmission modes by which information is read out from said first seismic unit.

17. A method as set forth in claim 16, wherein said first seismic unit reads out said first and second seismic outputs via said first and second output modes, for a common seismic event.

18. A method as set forth in claim 16, wherein said first seismic unit reads out said first and second seismic outputs via said first and second output modes, for different seismic events of said survey.

19. A method as set forth in claim 16, wherein said first seismic unit selectively provides an output via either said first output mode or said second output mode depending on one or more monitored conditions.

20. A method as set forth in claim 19, wherein said monitored conditions include any one or more of available transmission bandwidth, a level of potentially interfering transmissions, a status of a transmission pathway, battery life, memory capacity and an ability to keep up with seismic data acquisition.

21. A method as set forth in claim 16, wherein said first seismic unit selectively provides an output via either said first output mode or said second output mode depending on a current time.

22. A method as set forth in claim 21, wherein an output mode is selected as a function of time based on one of time-dependent transmission restrictions and a program for defining output mode as a function of time.

23. A method as set forth in claim 16, wherein said array utilizes multiple output modes in connection with said survey including at least one remote reporting output mode and a nodal mode.

24. A method as set forth in claim 23, wherein said remote reporting output mode is a wireless output mode.

25. A method as set forth in claim 23, wherein at least most of the seismic information of said survey from at least most of said seismic units is provided via said nodal mode and at least some of the seismic information of said survey from some of the seismic units is provided via said remote reporting mode.

26. A method as set forth in claim 23, wherein at least most of the seismic information of said survey from at least most of said seismic units is provided via said remote reporting mode and at least some of the seismic information of said survey from some of the seismic units is provided via said nodal mode.

27. A method as set forth in claim 16, wherein said array utilizes multiple output modes in connection with said survey including at least a wireless output mode and a cable mode.

28. A method as set forth in claim 27, wherein said wireless output mode is used in an array area including one of a road, a waterway, a populated area or another potential cable obstruction.

29. A method for use in conducting a seismic survey, comprising the steps of:
configuring an array of seismic units for conducting a seismic survey of a survey area;
generating a seismic event;
first obtaining first seismic information corresponding to said first seismic event at a first seismic unit of said array;
second obtaining second seismic information corresponding to said first seismic event at a second seismic unit of said array;
first outputting said first seismic information from said first seismic unit using a first output mode;
second outputting said second seismic information from said second seismic unit using a second output mode different than said first output mode;
third outputting at least one of said first seismic information from said first seismic unit via each of said first output mode and said second output mode with respect to a single seismic event or said second seismic information from said second seismic unit via each of said first output mode and said second output mode with respect to the single seismic event; and
operating a processor to combinatively process said first and second seismic information.

* * * * *